United States Patent
Okabe et al.

(10) Patent No.: US 7,508,973 B2
(45) Date of Patent: Mar. 24, 2009

(54) METHOD OF INSPECTING DEFECTS

(75) Inventors: Takafumi Okabe, Yokohama (JP);
Shunji Maeda, Yokohama (JP);
Yukihiro Shibata, Fujisawa (JP);
Hidetoshi Nishiyama, Fujisawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 938 days.

(21) Appl. No.: 10/809,321

(22) Filed: Mar. 26, 2004

(65) Prior Publication Data
US 2004/0228515 A1    Nov. 18, 2004

(30) Foreign Application Priority Data
Mar. 28, 2003   (JP)   ............... 2003-089630
Jun. 27, 2003   (JP)   ............... 2003-183933

(51) Int. Cl.
*G06K 9/00*    (2006.01)
*G06F 3/048*   (2006.01)

(52) U.S. Cl. .................. 382/145; 382/144; 715/838
(58) Field of Classification Search .................. 382/145
See application file for complete search history.

(56) References Cited

U.S. PATENT DOCUMENTS

| | | | |
|---|---|---|---|
| 5,546,247 A * | 8/1996 | Fujioka et al. ........... 360/77.13 |
| 6,738,505 B1 * | 5/2004 | Prince ..................... 356/237.5 |
| 6,771,804 B1 * | 8/2004 | Maetschke ................. 382/141 |
| 7,113,628 B1 * | 9/2006 | Obara et al. .................. 702/35 |
| 7,409,081 B2 * | 8/2008 | Ogi ............................. 382/145 |
| 2001/0036306 A1 * | 11/2001 | Wienecke ................... 382/149 |
| 2001/0048761 A1 * | 12/2001 | Hamamatsu et al. ........ 382/149 |
| 2002/0054703 A1 * | 5/2002 | Hiroi et al. .................. 382/149 |

FOREIGN PATENT DOCUMENTS

| | | |
|---|---|---|
| JP | 58-070540 | 4/1983 |
| JP | 10-311757 | 11/1998 |
| JP | 2000-332500 | 11/2000 |
| JP | 3139998 | 12/2000 |
| JP | 2001-337047 | 12/2001 |
| JP | 2002-303586 | 10/2002 |
| JP | 2002-323458 | 11/2002 |

* cited by examiner

*Primary Examiner*—Matthew C. Bella
*Assistant Examiner*—Sath V. Perungavoor
(74) *Attorney, Agent, or Firm*—Antonelli, Terry, Stout & Kraus, LLP.

(57) ABSTRACT

A method of inspecting detects includes assigning a plurality of sets of image acquisition conditions, executing inspection using each of the sets of conditions, classifying all detected defects into real defects and false defects by use of an automatic defect classification function, and selecting, from the plurality of sets of conditions, a set of conditions ideal for detection.

10 Claims, 31 Drawing Sheets

FIG. 4A

EXAMPLE SHOWING THE RELATIONSHIP OF DEFECT OR FILE

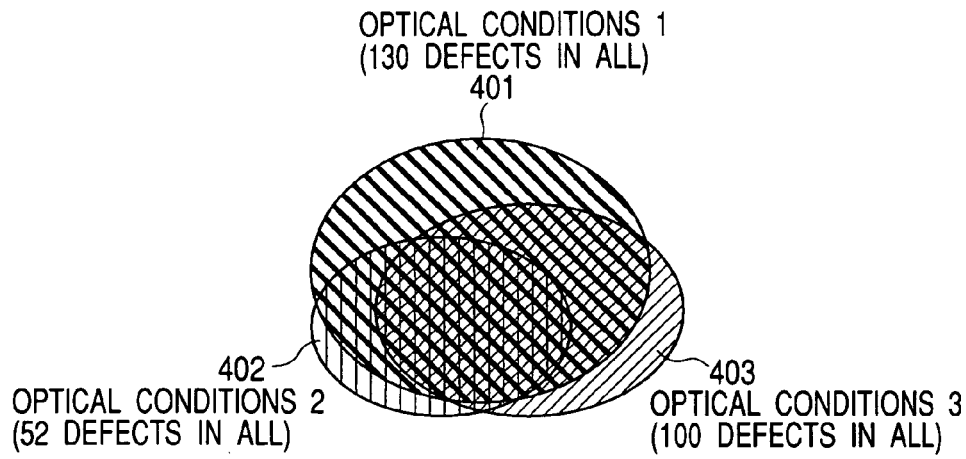

FIG. 4B

EXAMPLE SHOWING A BREAKDOWN OF DEFECTS FOR EACH SET OF CONDITIONS

| OPTICAL CONDITIONS | REAL DEFECTS ($\alpha$) | MISSES ($\beta$) | FALSE DEFECTS ($\gamma$) | ERRORS ($\beta + \gamma$) |
|---|---|---|---|---|
| 1 | 100 | 20 | 30 | 50 |
| 2 | 50 | 70 | 2 | 72 |
| 3 | 90 | 30 | 10 | 40 |
| TOTAL (OR) | 120 | - | - | - |

FIG. 4C

EXAMPLE SHOWING A CRITERIA ASSIGNMENT WINDOW FOR SELECTION OF CONDITIONS

ASSIGNING CRITERIA
- ⦿ MAXIMUM SENSITIVITY: MAXIMUM NUMBER OF REAL DEFECTS DETECTED
- ◎ MINIMUM FALSE DEFECT COUNT: MINIMUM NUMBER OF FALSE DEFECTS DETECTED
- ◎ MINIMUM ERROR COUNT: MINIMUM NUMBER OF FALSE DEFECTS DETECTED + MISSES

FIG. 6

| OPTICAL CONDITIONS SELECTION RESULT | |
|---|---|
| OPTICAL CONDITIONS NO. | 3 |
| CAMERA | TDI |
| PIXEL SIZE | 0.25000 |
| WAVELENGTH FILTER | 3 |
| SPATIAL FILTER | 5 |
| ND FILTER | 50% |
| APERTURE STOP | 2 |
| LIGHT SOURCE | Halogen |
| FOCUS OFFSET QUANTITY | −0.3 |

OK  CANCEL  STANDARD  RESET

FIG. 11

| OPTICAL CONDITIONS | DEFECT 1 ON | DEFECT 2 ON | DEFECT 3 ON | UNCLEAR OFF | FALSE OFF | ON TOTAL | OFF TOTAL |
|---|---|---|---|---|---|---|---|
| 1 | 10 | 60 | 10 | 10 | 20 | 80 | 30 |
| 2 | 30 | 40 | 20 | 40 | 30 | 90 | 70 |
| 3 | 20 | 30 | 10 | 5 | 5 | 60 | 10 |
| 4 | 15 | 15 | 15 | 15 | 15 | 45 | 30 |
| 5 | 20 | 30 | 20 | 2 | 1 | 70 | 3 |

METHOD OF INSPECTING DEFECTS

This application claims priority to the following foreign applications of JP 2003-089630 filed on Mar. 28, 2003 and JP 2003-183933 filed on Jun. 27, 2003.

BACKGROUND OF THE INVENTION

The present invention relates to defect inspections such as pattern inspection for detecting defective states, for example, short (short-circuiting) or open (wire disconnections), of the pattern to be inspected and particle inspection for detecting foreign particles on the pattern. More particularly, the invention relates to: the assistance technology for assigning (setting) the inspection recipes used for defect inspection tools which perform defect inspections on the patterns of semiconductor wafers, liquid-crystal displays, photomasks, and the like; and the technology for classifying detected defects.

As the tendencies towards shorter semiconductor product-life cycles and towards the shift to flexible manufacturing primarily of system LSIs are increasing, the demand for early establishment of mass-production process conditions is increasingly growing. Inspection tools for visually inspecting semiconductor products, acquiring information on the occurrence status of defects, and obtaining guidelines on adjustment of process conditions or detecting unusual process states, are extremely important in semiconductor manufacturing processes. Darkfield and brightfield inspection tools or electron-beam-type pattern inspection tools/defect reviewing tools are already commercialized as semiconductor visual inspection tools.

The parameter assignment procedure using such a conventional inspection tool is described below. Parameters are broadly divided into image acquisition conditions parameters (hereinafter, referred to as image acquisition parameters), and image-processing conditions (inspection conditions) assignment parameters (inspection parameters). Image acquisition parameters are parameters for detecting an appropriate image. For example, for an optical visual inspection tool, optical conditions, such as a magnification (pixel size), a focal position offset quantity, illumination wavelength and light intensity, various filtering conditions, and an aperture stop value, are equivalent to the image acquisition parameters mentioned above.

Inspection parameters are parameters that need to be assigned for appropriate processing of a detected image. For example, binary thresholds for extracting only defective portions from the defected image in a binary format, denoising-filter size thresholds for removing as noise a minute-area region independent of defects, a parameter for reducing sensitivity at an edge of the wafer, and other data are equivalent to the above inspection parameters.

In conventional inspection tools of this type, such an inspection parameter assignment procedure as shown in FIG. 31 has been used. This procedure is described below. First, in step S3101, the wafer to be inspected is set up for inspection. Image acquisition parameters are tentatively assigned in step S3102, and in step S3103, a suitable location on the pattern to be inspected is imaged and image quality is confirmed. For example, if the image is too dark, the light intensity is increased, or if the image is too low in contrast level, optical conditions such as filtering or aperture stop conditions are modified or focus is adjusted.

The parameter assignment and image quality confirmation steps mentioned above are repeated until a desired image has been obtained, and when the desired image is obtained, the above-assigned image acquisition parameters are registered in step S3104. Following this, tentatively assigned inspection parameters are used in step S3105 to perform provisional inspections (test inspection) in step S3106.

After the inspections have been performed, the positions of the defects detected are reviewed in step S3107 and the assignments of the inspection parameters are verified in step S3108. At this time, the following corrective actions are conceivable to be taken: for example, if false defects, not real defects, are detected in greater numbers than assumed, when sensitivity is too high, binary thresholds are increased. If the number of very small defects is greater than necessary, the denoising-filter size is increased.

By repeating the above-described inspection parameter reassignment, test inspection re-execution, and inspection result reconfirmation steps until desired detection sensitivity has been obtained, inspection parameters are determined and the parameters are registered in order for the assignment thereof to be completed in step S3109.

Japanese Patent Laid-open No. 2001-337047 discloses an optimum recipe-creating method in which a simulated defect wafer for obtaining desired detection sensitivity is created, the method not depending on the technical skill level of the operator.

In addition, as regards the classification of defects, Japanese Patent No. 3139998 discloses a method in which the section to be analyzed for defect classification is sampled from detected defects and defect detection and part of defect classification are concurrently performed.

In both types of conventional art mentioned above, since the procedure for performing inspections each time inspection conditions are assigned and then reviewing the results must be repeated until desired image quality and inspection sensitivity have been obtained, and since all steps, except for test inspection, must be manually performed by an operator, there has been the problem that great deals of labor and time are required until a recipe has been determined. In the reviewing operations, there has been incurred the waste that the same real defect (or false defect) is reviewed with each modification of conditions. Also, assignment operations have the problem that since it is not easy to compare results between sets of inspection conditions, it is difficult to select the optimum conditions. Assignment of contrast threshold data, in particular, has relied on the experience of the operator and required a trial-and-error approach.

In addition, the method of sampling the defects to be classified during defect classification has presented the problem that: since the classification becomes a time-consuming step because of too low throughput of the classification/analysis processor, although this conventional method is effective in the case where the analyzing time significantly exceeds the inspection time even by parallel execution of the inspection and the classification, not all defects can be classified and this causes the omission of classification of a target defect to which the user is originally to pay attention.

The above conventional method has also posed the problem that since the defect distribution state of the entire wafer cannot be accurately identified, this distribution state is only estimated.

SUMMARY OF THE INVENTION

An object of the present invention is to provide a defect inspection method for facilitating the determination of an inspection recipe and allowing reduction in the labor and time required for the selection of optimum conditions.

Another object of the present invention is to provide a defect inspection method capable of detecting defects with high accuracy in accordance with a selected and assigned inspection recipe.

Yet another object of the present invention is to provide a defect inspection method in which all detected defects makes their classification complete almost simultaneously with completion of inspection.

More specifically, a defect inspection method embodying the present invention comprises:

a step of assigning an inspection recipe;

a step of inspecting a sample using the inspection recipe assigned; and a step of outputting results of the inspection;

wherein said step of assigning an inspection recipe further includes the steps of:

sequentially acquiring images of a sample under a plurality of sets of image acquisition conditions differing from each other and acquiring a plurality of image signals each different in image acquisition conditions;

detecting defect candidates for each of the plurality of sets of image acquisition conditions from each of the plurality of image signals that were sequentially acquired under different sets of image acquisition conditions in said image signal acquisition step, and then acquiring position information of the defect candidates detected;

creating an OR file of defect candidates for each of the plurality of sets of image acquisition conditions on the basis of position information of the defect candidates which were detected under each of the plurality of sets of image acquisition conditions; and reviewing the same defect candidate only one time (without overlapping) on the basis of the OR file of defect candidates that was created for each of the plurality of sets of image acquisition conditions.

Another defect inspection method embodying the present invention comprises:

a step of assigning an inspection recipe;

a step of inspecting a sample using the inspection recipe assigned; and a step of outputting results of the inspection;

wherein said step of assigning an inspection recipe further includes the sub-steps of:

acquiring an image signal from a required sample, in a defect inspection tool;

detecting a defect candidate from the image signal acquired, on the basis of desired inspection conditions;

classifying the defects detected into different types; and on the basis of the classification results, selecting or adjusting and assigning inspection conditions as an inspection recipe for the defect inspection tool in accordance with conditions selection criteria.

Also, the present invention is characterized in that the classification step includes a step in which the above classification is accomplished by analyzing the distribution of occurrence of defects on a sample.

Also, the present invention is characterized in that the classification step includes a step in which the above classification is accomplished by judging whether a particular defect is a killer defect of a non-killer defect.

Also, the present invention is characterized in that the classification step includes a step in which a defect that was classified as a real defect (especially, a foreign particle defect) during the above classification is analyzed using results of defect component analysis with EDX (Energy Dispersive X-ray) spectroscopy, EMPA (Electron Probe Micro Analyzer), or the like.

Also, the present invention is characterized by including a step in which a reviewing and sampling rate is presented according to a particular category of the defect which was classified in the classification step. In addition, the present invention is characterized by repeating the image signal acquisition step, the defect detection step, and the classification step a plurality of times under the same image acquisition conditions.

Furthermore, an embodiment of the present invention comprises:

an image signal acquisition step in which, in a defect inspection tool (apparatus), an image signal is acquired from a required sample;

a defect detection step in which, from the image signal acquired from said image signal acquisition step, a defect candidates are detected on the basis of desired inspection conditions;

a classification step in which the defect candidate that were detected in the defect detection step are classified into different types; and a selection step in which, on the basis of the classification results obtained in said classification step, inspection conditions are selected (or adjusted) and assigned as an inspection recipe for the defect inspection tool in accordance with conditions selection criteria (standard).

According to another aspect of the present invention, there is provided an inspection recipe assignment method implemented by a defect detection tool comprising:

a position assignment unit capable of assigning a plurality of positions in a region to be inspected, such as target pattern positions and target defect positions;

an image acquisition conditions assignment unit (or an inspection conditions assignment unit) capable of assigning a plurality of image acquisition conditions (or inspection conditions);

an image acquisition assignment unit (or an inspection implementing unit) for implementing image acquisition (or inspection) at each position assigned by said position assignment unit, under the conditions assigned by said image acquisition assignment unit (or inspection implementing unit); and a display unit for displaying a list of images acquired as defect images.

Thus, since the use of the defect detection tool allows image comparison between sets of inspection conditions, selection of conditions becomes easy and the labor and time required for assignment of the conditions can be reduced.

These and other objects, features, and advantages of the invention will be apparent from the following more particular description of preferred embodiments of the invention, as illustrated in the accompanying drawings.

BRIEF DESCRIPTION OF THE DRAWINGS

FIG. 4A is a diagram illustrating the relationship of a defect OR file as an embodiment which shows defect detection results for each set of optical conditions in the present invention;

FIG. 4B is a diagram illustrating an embodiment of displaying a breakdown of defects for each set of optical conditions in the present invention;

FIG. 4C is a view showing a criteria assignment screen for selection of optical conditions;

FIG. 6 is a view showing an embodiment of an optical conditions selection result confirmation screen pertaining to the present invention;

FIG. 11 is a diagram showing another embodiment of defect detection result display for each set of optical conditions in the present invention;

DESCRIPTION OF THE PREFERRED EMBODIMENTS

An embodiment of a defect inspection tool (visual inspection tool) pertaining to the present invention is described below using the accompanying drawings. The present embodiment facilitates assignment of an inspection recipe comprising image acquisition parameters (image acquisition conditions: optical conditions) and inspection parameters (inspection conditions) for a pattern which is to be inspected using a defect inspection tool (apparatus).

Figure 1:
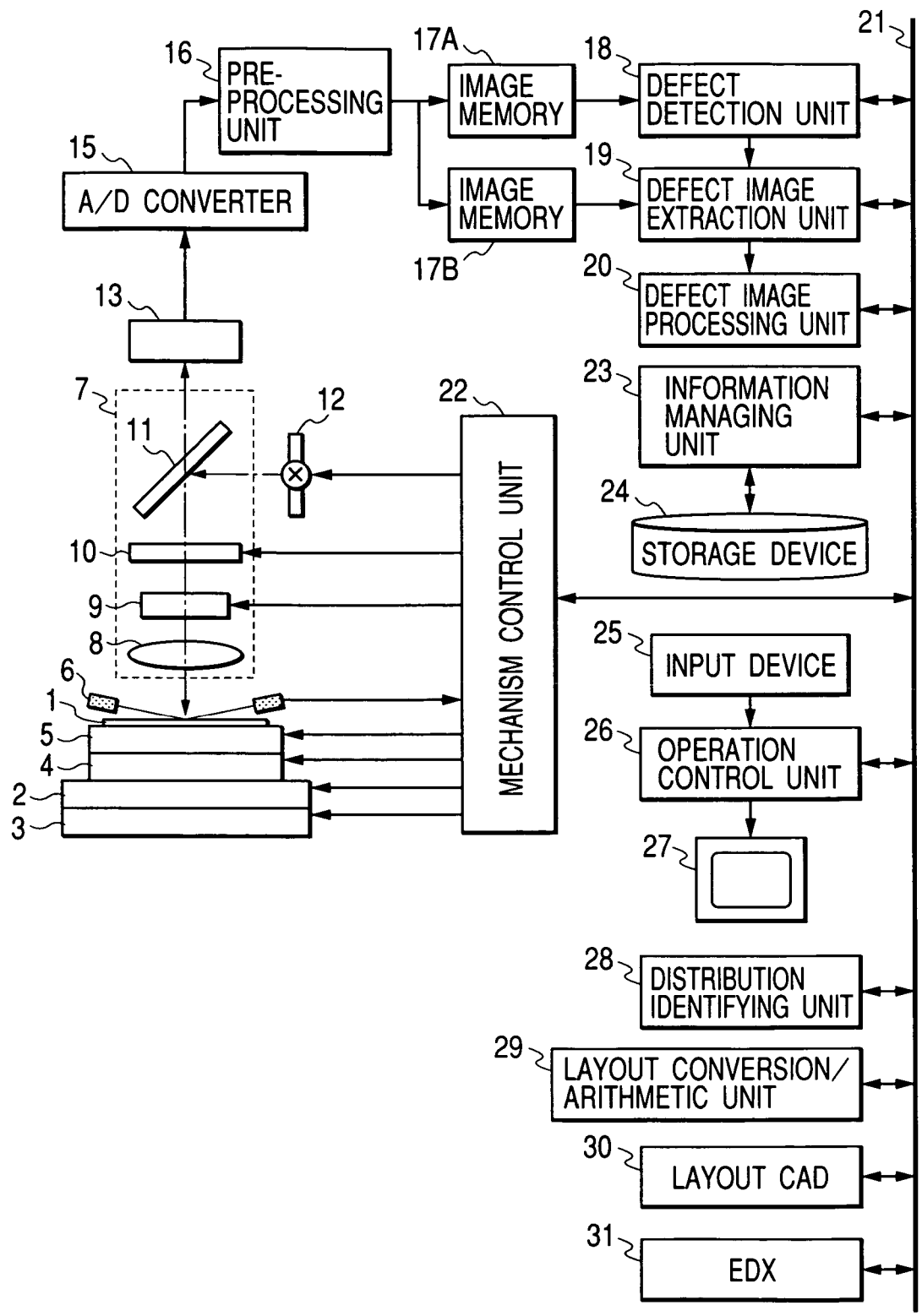
FIG. 1 is a diagram showing an embodiment of a system configuration of a defect inspection tool (visual inspection tool) pertaining to the present invention.

An example of a system configuration of a defect inspection tool (visual inspection tool) which applies, in the present invention, the scheme for assigning inspection conditions as an inspection recipe or the like, is shown in FIG. 1. FIG. 1 is a diagram showing an embodiment of an optical defect inspection tool (apparatus). In this figure, an optical system 7 includes an objective lens 8, optical conditions modification elements (for example, filters) 9, optical conditions modification elements (for example, optical filters) 10, a polarizing beam splitter 11, and other elements. Light irradiated from a light source 12 reflects by means of the polarizing beam splitter 11, transmits the objective lens 8, and illuminates a sample 1 (for example, a semiconductor wafer) to be inspected.

The light for illumination can be, for example, lamp light, laser light, or the like, and either visible light, ultraviolet light (UV light), deep-ultraviolet light (DUV light), vacuum-ultraviolet light (VUV light), extreme-ultraviolet light (EUV light), or the like can be used in terms of wavelength. Of all the light reflected, diffracted, and scattered by contact with a pattern on the wafer 1, only light that has propagated through a numerical aperture (NA) of the objective lens 8 is captured thereby once again, whereby an optical image is formed on an image plane. Image signals that have been detected by a detector 13 such as a time-delayed integration sensor are converted into digital signals by an A/D converter 15. After undergoing image compensations (such as shading compensation and dark level compensation) in a pre-processing unit 16, the digital signals are temporarily stored into image memories 17A and 17B. A defect detector 18 processes a wafer pattern image stored into the image memory 17A, then conducts defect detection (for example, mismatch processing based on either die-to-die comparison, cell-to-cell comparison, or hybrid comparison which is a combination of the former two comparisons), and extracts defect information such as coordinates and sizes of defects. The above defect detection may be based on a binary threshold for judging any differences between the defects or detected images derived from die-to-die comparison, cell-to-cell comparison, or hybrid comparison results on the detected images. These pieces of defect information are sent to a defect image extraction unit 19 via a special interface or a network 21.

On the basis of the defect information, the defect image extraction unit 19 extracts, from a wafer pattern image within the image memory 17B, a defect candidate image and a reference image to be compared, and sends the latter two images to a defect image processing unit 20 via a special interface or the network 21. Similarly, defect candidate information is also sent from the defect detection unit 18 to the defect image processing unit 20 via a special interface or the network 21.

The defect image processing unit 20 processes a defect image and the reference image and computes detailed defect attribute data. A variety of defect candidate attributes (characteristic values) are possible. They may include a size (such as area or X- and Y-axial lengths) of a defect, grayscale level information (contrast information), and background pattern information (such as line width, pattern density, and grayscale level) of the defect. The defect image processing unit 20 classifies defects on the basis of the attribute data acquired. In order for the defect image processing unit 20 to compute attribute data for all defect candidates, it is necessary to consider composition of the processor so that, as in the foregoing, it has a sufficiently high throughput or so that a plurality of processors operate in parallel.

Figure 2:
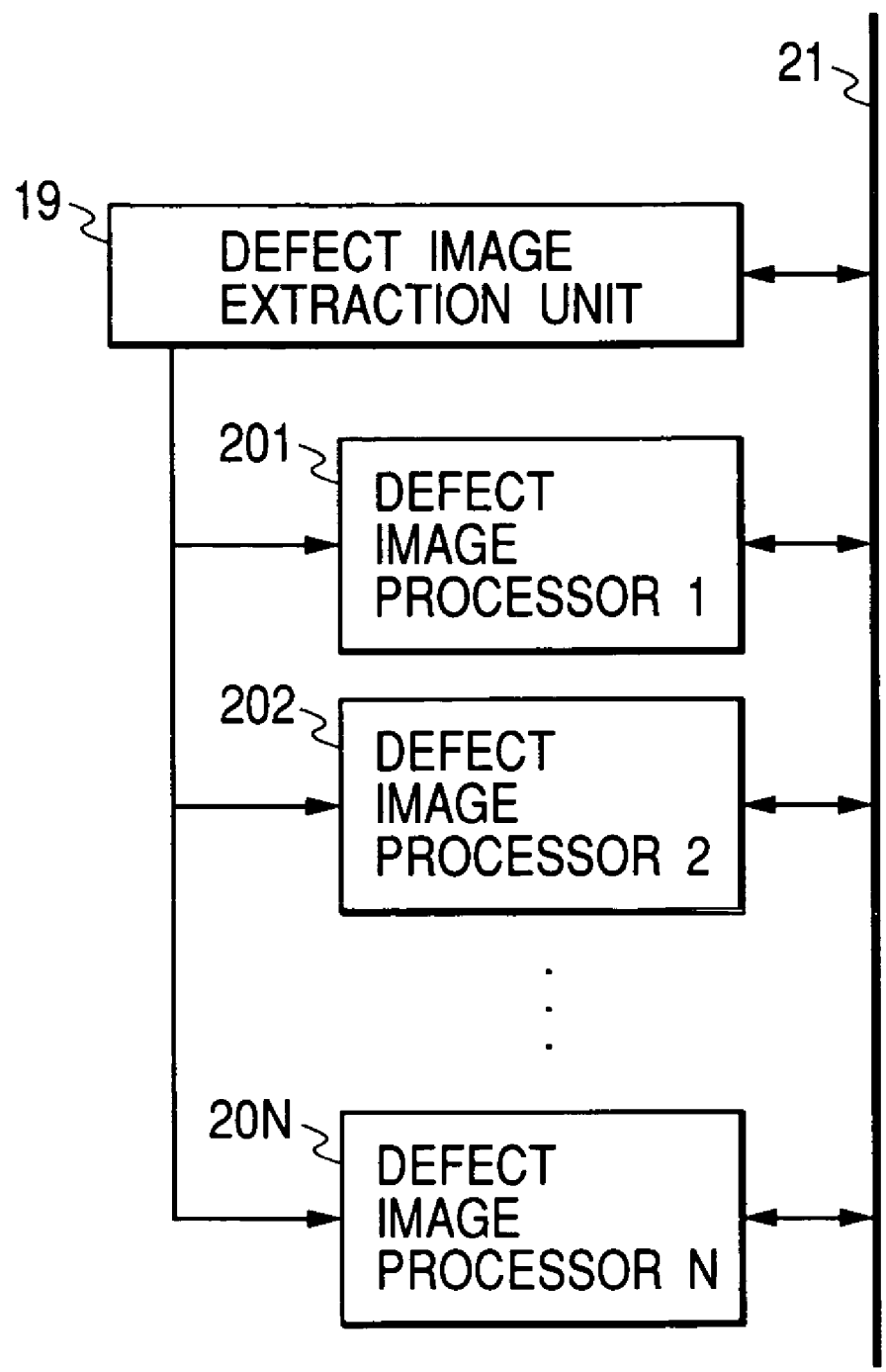
FIG. 2 is a diagram showing an embodiment of part of the system configuration of the defect inspection tool (visual inspection tool) pertaining to the present invention.

FIG. 2 shows an embodiment in which the N number of processors are arranged in parallel to construct the defect image processing unit 20. In this embodiment, necessary data is sent from the defect image extraction unit 19 to a defect image processor 1 (201), a defect image processor 2 (202), and so on up to a defect image processor N (20N), in that order, via a special interface or a network 21. Parallel processing is executed in each processor, and processing results are transferred via the network 21.

Meanwhile, when number of defects which perform attribute data computation and classification are selected (are sampled) from all defect candidates, since the throughput of the aforementioned processor or the number of parallel processors can be reduced, this simplifies configuration of units, thus yielding a cost reduction effect. Conversely, when the composition of the defect image processing unit 20 is limited, the need arises to adjust a sampling rate so that the number of defects to perform processing matches the throughput of the processor.

The defect candidate image obtained from the defect image processing unit 20 as the above processing results, and defect information such as coordinates, attribute data, and classification results, are transferred to an inspection information managing unit 23 via the network 21 and stored/saved in a storage device 24, from which, at the same time, the above image and information are then further transferred to an operation control unit 26. The operation control unit 26 processes received defect information, marks defect positions on a wafer map displayed at a display 27, and displays a received defect image and the like. A theta-stage (a rotation stage) 5 with a sample 1 mounted thereon, a Z-stage 4, a Y-stage 3, and an X-stage 2 are controlled by a mechanism control unit 22. The mechanism control unit 22 also controls light intensity of the light source 12 by means of, for example, an ND (Neutral Density) filter, and controls the optical system 7 which includes a wafer height measuring instrument 6, and various filters (such as spatial filter, wavelength filter, and aperture) 9, 10. An image of required focus with respect to a pattern on the sample 1 such as a wafer, can be acquired by controlling the Z-stage 4 and moving the sample 1 in a vertical direction on the basis of a signal from the wafer height measuring instrument 6.

The operation control unit 26 includes a user interface for sending control commands to the pattern inspection system shown in FIG. 1. A user uses an input device 25 (such as a keyboard, a mouse, a joystick, or the like) to assign basic data (such as a product name of a wafer to be inspected, and process data), optical conditions, image-processing parameters, an inspection region, image acquisition positions, and other data. These types of data are assigned via an inspection parameter assignment screen for assigning image-processing conditions (inspection conditions), a parameter assignment screen for assigning image acquisition conditions (optical conditions), or an image acquisition position assignment screen for assigning image acquisition positions (coordinates).

Figure 8A:
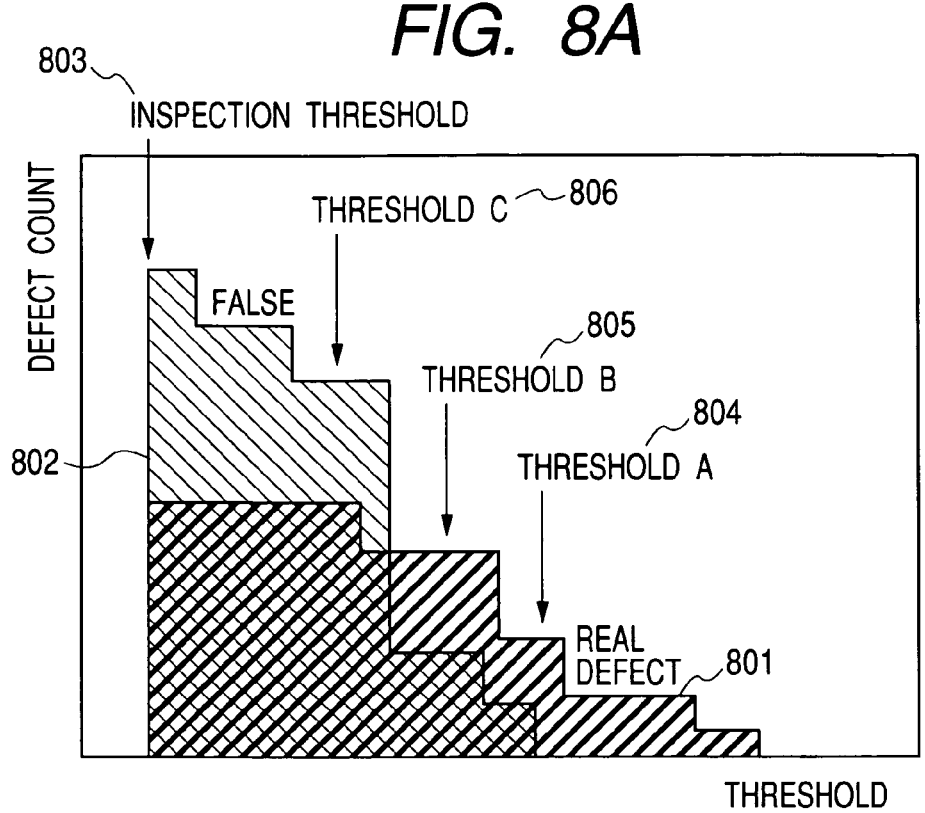
FIGS. 8A and 8B is a flowchart showing an embodiment of assignment criteria relating to inspection parameters (for example, a judgment threshold and a judgment threshold for an attribute) in the present invention.
Figure 8B:
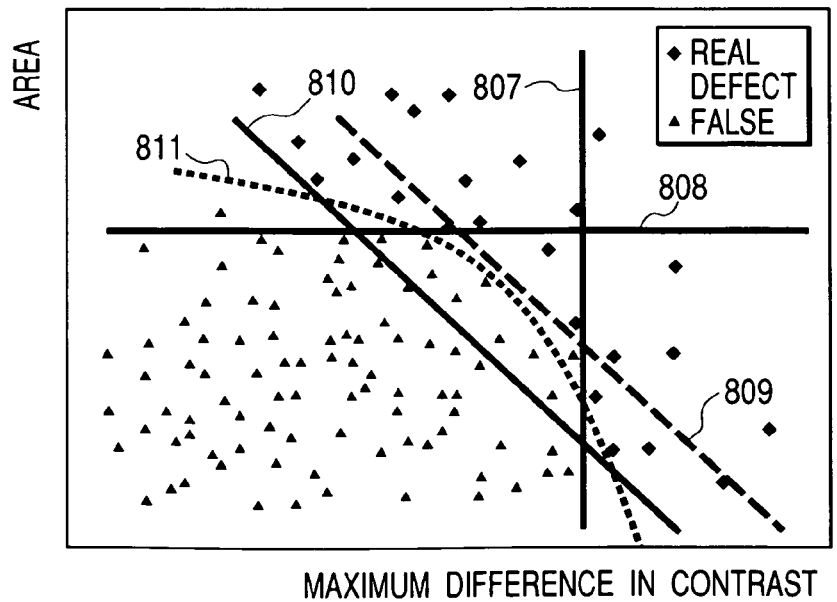

The inspection parameters (inspection conditions) here refer to such data as shown in, for example, FIGS. 8A and 8B. More specifically, equivalents of the above inspection parameters (inspection conditions) are: binary thresholds for extracting only defective portions of a detected (acquired) image in binary form; denoising-filter size thresholds for removing as noise a minute-area region independent of defects; a parameter for reducing sensitivity at an edge of the wafer; thresholds for conducting real/false defect judgments based on attribute data of a defect; and other parameters.

Figure 5:
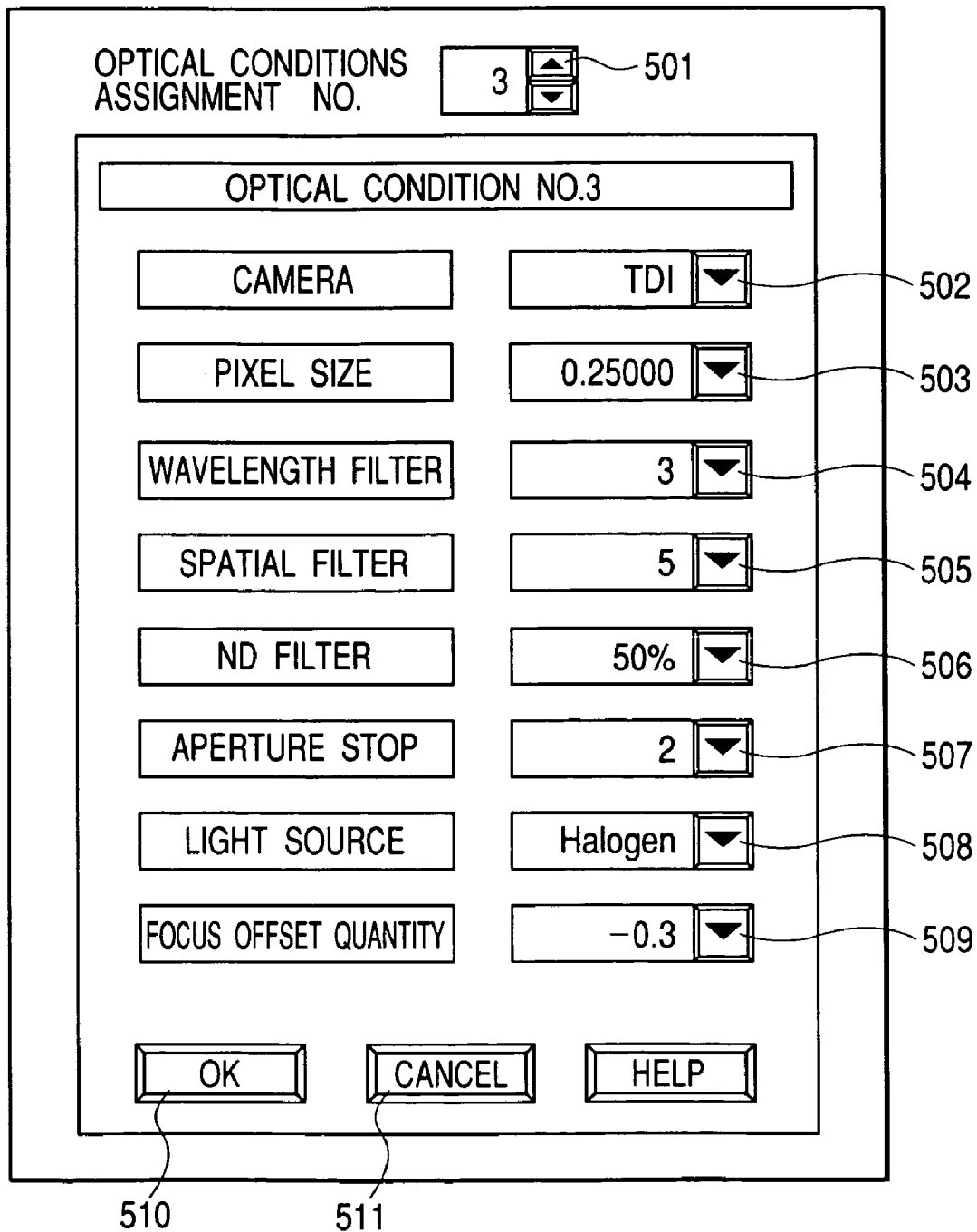
FIG. 5 is a view showing an embodiment of an optical conditions assignment screen pertaining to the present invention.

Image acquisition parameters are parameters for detecting an appropriate image. For example, for an optical visual inspection tool (defect inspection tool), such optical conditions as shown in FIGS. 5 and 6, namely, a magnification (pixel size), a focal position offset quantity, illumination wavelength and light intensity, various filtering conditions, an aperture stop value, etc. are equivalent to the image acquisition parameters mentioned above. For a SEM type of visual inspection tool, an acceleration voltage, a beam current, a beam-spot diameter, a scan rate, and other data become concerned as optical conditions.

A distribution identifying unit 28 uses the defect coordinate information (chip address and in-chip defect coordinates) and classification information (category information) that were detected, then transferred to the information managing unit 23, and stored into the storage device 24. The distribution identifying unit 28 uses such information to analyze distribution states of in-wafer and in-die defects independently for each defect category or analyze distribution states of all defects and thus to judge whether the above-analyzed distribution status for each defect category or of all defects resembles a known pattern. Accordingly, the distribution identifying unit 28 can also identify the process or the process apparatus that caused a particular defect. For example, if defects (scratches) are distributed in an arc form, the distribution identifying unit 28 can estimate the scratches to have occurred in a CMP (Chemical Mechanical Polishing) process.

In addition, a layout conversion/arithmetic unit 29 acquires circuit layout data of the sample 1 from a layout CAD 30 via the network 21 and then creates an in-chip pattern layout from the thus-acquired circuit layout data of the sample, whereby the layout conversion/arithmetic unit 29 can obtain pattern information (such as pattern density and line width) of chips present at the defect detection positions stored within the storage device 24. Consequently, it is possible to judge whether a particular defect is a killer defect (OPEN or SHORT) or a non-killer defect (a mere isolated defect not directly relating to OPEN or SHORT), and the case may be, to identify causes of the defect. The layout data referred to in such a case is primarily the corresponding layer, but a plurality of sets of layer information on previous processes may require reference. Identification of defect causes, for example, is usually targeted for the corresponding layer, so layout data may be used in such a manner that, for example, after examination of the layer on which the defects exist, only defects present on that layer are extracted and the defects that occurred on layers concerned with previous processes are removed or otherwise set as defects not to be analyzed.

Furthermore, a component analyzer (EDX such as a mass spectroscope or spectroscopic analysis tool) 31 can identify causes of defects more accurately by acquiring defect component information on each defect and analyzing the defect component information in conjunction with the defect classification information obtained from the storage device 24 within this inspection tool. For example, by analyzing the composition of detected foreign particles, the component analyzer (EDX) 31 has the capability to identify the process in which the material was used, or whether gas components are contained, or even to identify in what section of what process apparatus the particles occurred.

Although, in the above description, defects are classified by the defect image processing unit 20 and analysis for identifying the process or the process apparatus causing a defect is undertaken by the distribution identifying unit 28, the layout conversion/arithmetic unit 29, and the component analyzer (EDX) 31, both processes may likewise be performed via the information managing unit 23 or the operation control unit 26.

Figure 29:
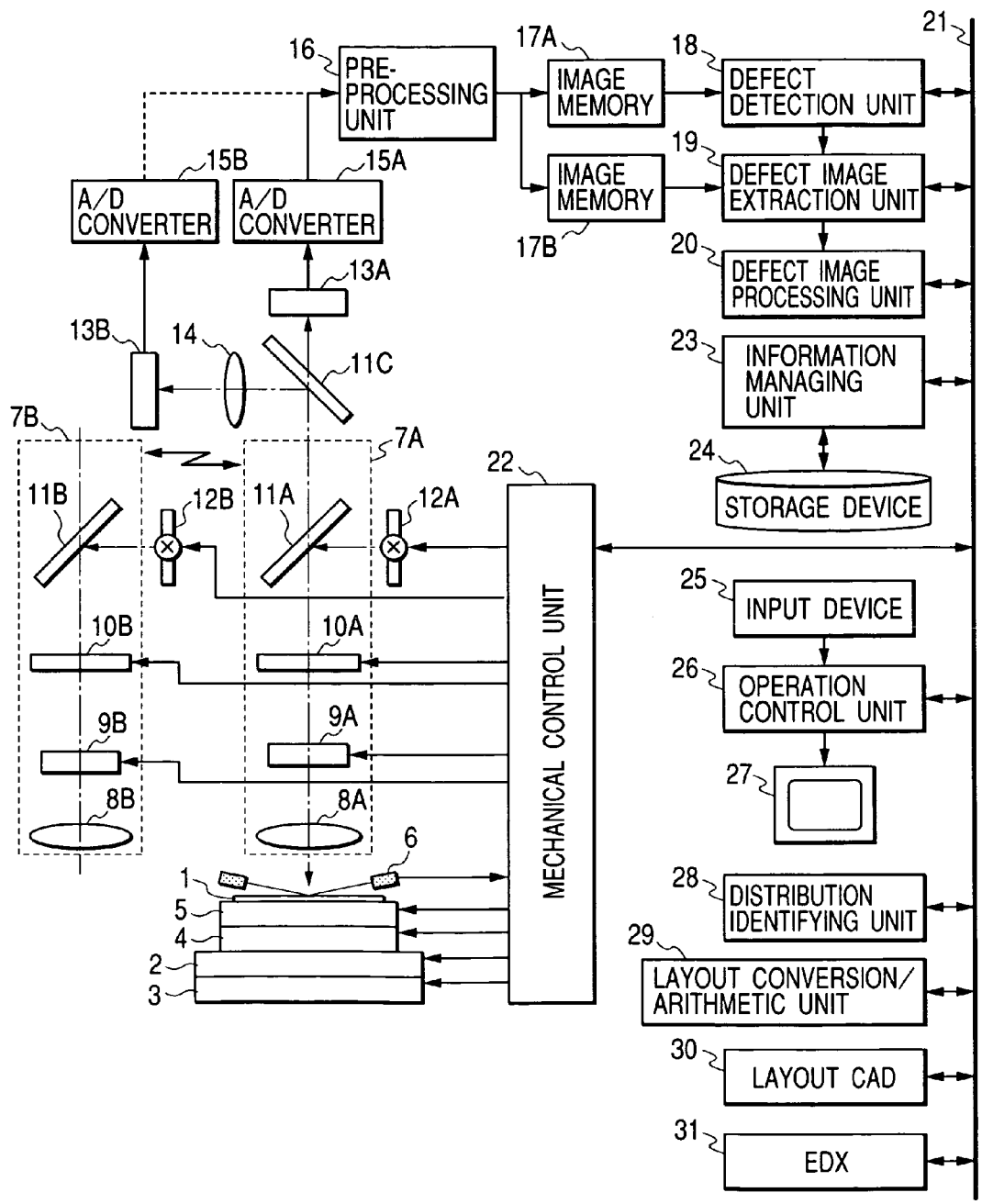
FIG. 29 is a diagram showing another embodiment of a system configuration of a defect inspection tool (visual inspection tool) pertaining to the present invention.

Although an embodiment of a system configuration has been described above using FIG. 1, the system configuration is, of course, not limited by this description and may adopt a scheme in which, as shown in FIG. 29, any one of a plurality of optical systems 7 (7A, 7B), any one of a plurality of light sources for illumination 12 (12A, 12B), and any one-of a plurality of detectors 13 (13A, 13B) are selectively used. For the light source for illumination 12, a wavelength of light needs to be changed by, for example, switching an ultraviolet or deep-ultraviolet light source to a broadband white-light source, or vice versa. In addition, for the broadband white-light source, a magnification also needs to be changed to a higher one to detect microdefects as small as several tens of nanometers (nm). In this way, a detector 13 also needs to be changed to a detector that matches a particular wavelength of light according to a particular wavelength of the light source actually used.

In addition, a combination of a polarizing beam splitter 11C and a lens 14 allows image acquisition via different illumination light sources 12A and 12B without switching the detectors 13A and 13B.

Figure 30:
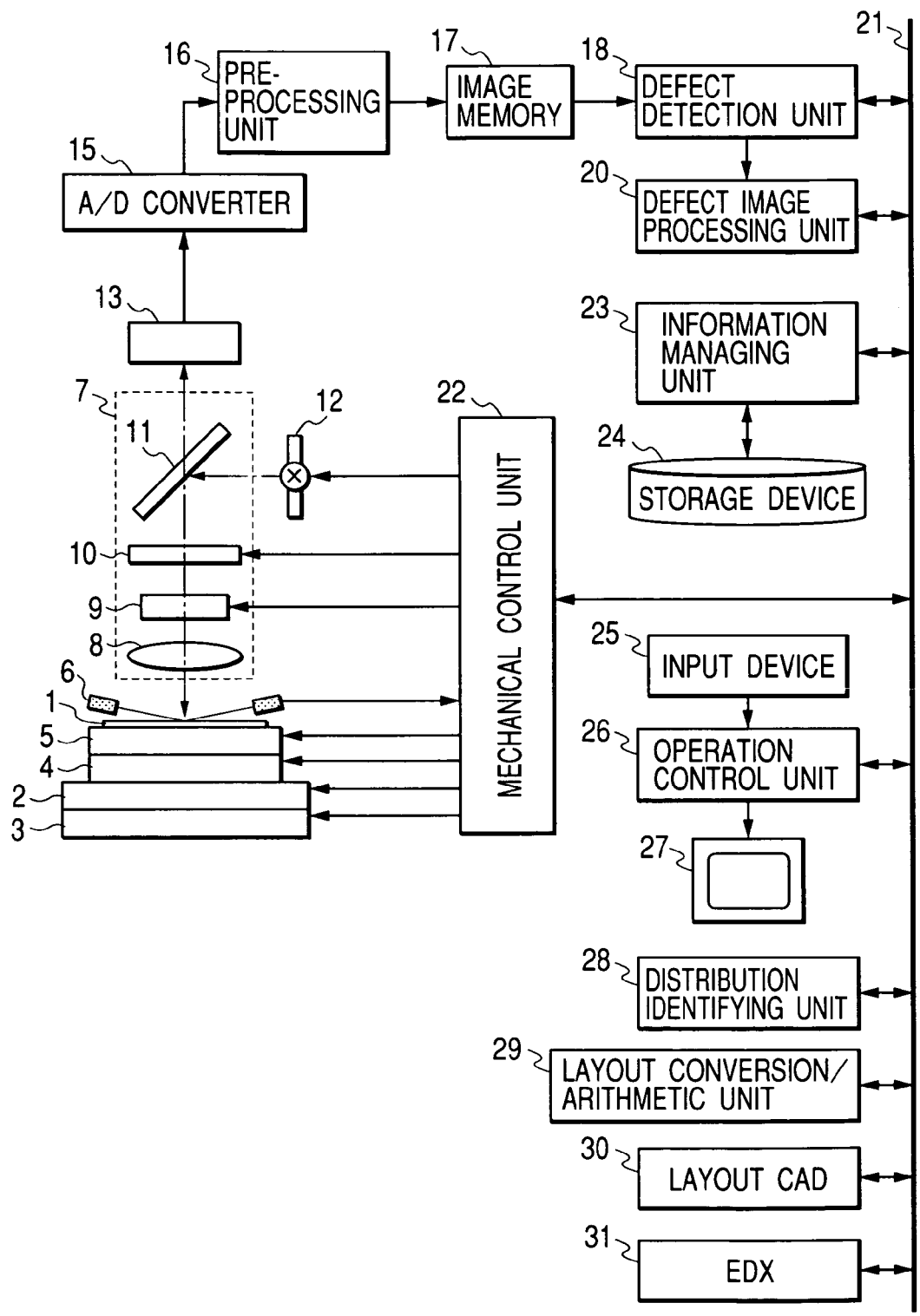
FIG. 30 is a diagram showing yet another embodiment of a system configuration of a defect inspection tool (visual inspection tool) pertaining to the present invention.
Figure 31:
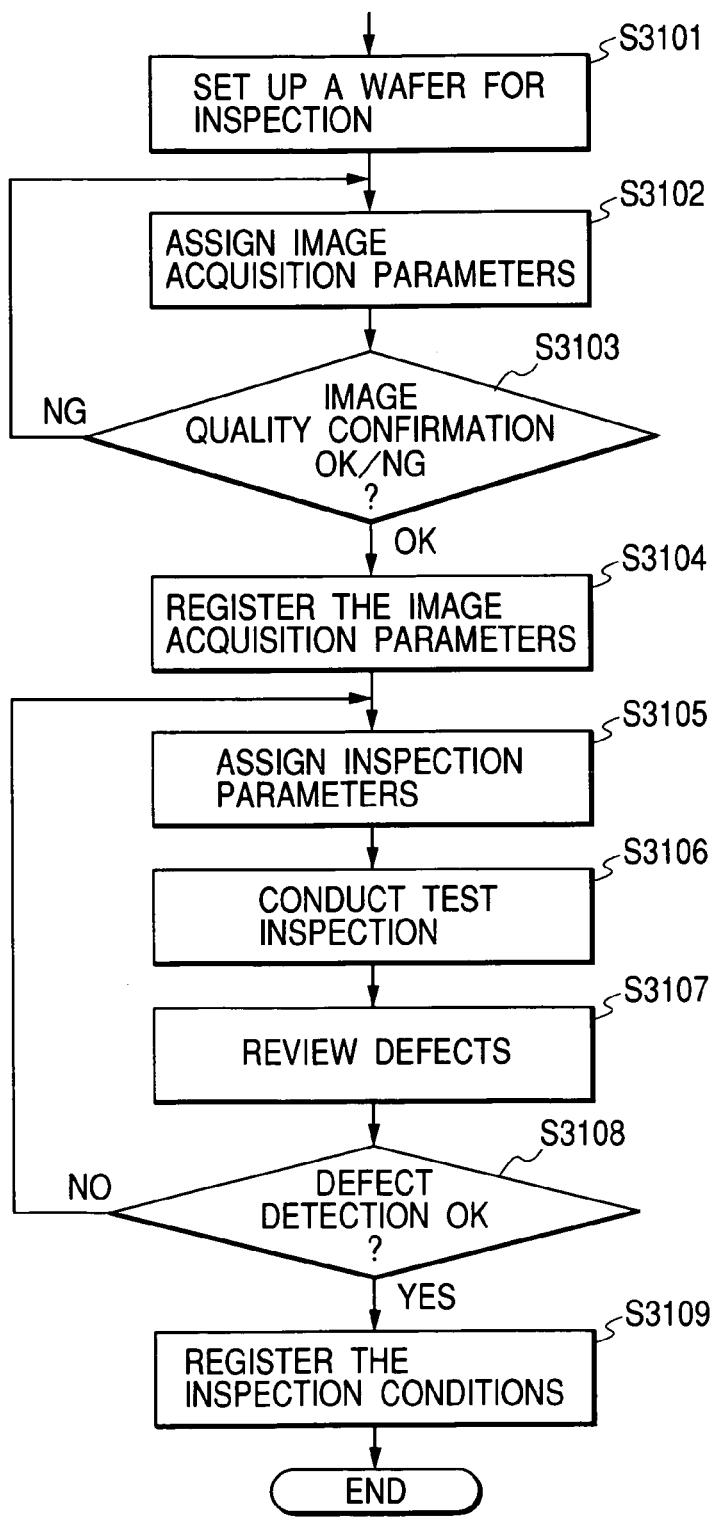
FIG. 31 is a flowchart showing the conventional method of assigning inspection conditions.

Furthermore, it is possible to detect defect candidates with the defect detection unit 18 on the basis of the wafer pattern image detected by the optical system 7 and stored into the image memory 17, then extract coordinates, sizes, and other information of the defect candidates and, at the same time, cut out (extract) an image of each defect candidate and a reference image, and send these images to the defect image processing unit 20. By using this procedure, as shown in FIG. 30, it becomes unnecessary for the number of image memories 17 to be plural and processing can be executed without the defect image extraction unit 19.

Next, an embodiment of a method of creating an inspection recipe automatically by use of such an visual inspection tool as shown in FIG. 1 is described below using FIGS. 2 to 28. As mentioned earlier herein, under the situation with increased use of nanoelectronic-level patterns (in terms of size, down to 0.1 micron or less, and further down to 80 nm or less), visual inspection tools are coming to be required to conduct inspections with higher sensitivity and at higher speed so as to be able to detect defects as minute as down to about 50 nm. At the same time, however, pursuit of higher-sensitivity inspection is likely to make the inspection tool detect false defects or unclear defects in large quantities, resulting in the pattern-under-inspection (the inspected pattern) being misjudged to be defective.

Semiconductor wafers and the like are manufactured via a multitude of manufacturing processes. Therefore, in the processes where a killer defect significantly affects the operational characteristics of the semiconductor device/chip, priority needs to be assigned to sensitivity during inspection so that flawed chips will not be manufactured. Despite the fact that non-flawed chips are being manufactured with priority assigned to reduction of detection errors (such as false or unclear defects) in the processes where a killer defect does not significantly affect the operational characteristics of the semiconductor device/chip, misjudging that the manufacture of flawed chips to be in progress could happen. It is required, therefore, that such misjudging be prevented and that during the processes performed between the above processes, sensitivity and the number of detection errors be controlled to stay at respective medial values. In any case, optical conditions (image acquisition parameters) and inspection conditions (inspection parameters) needs to be optimized according to not only the type of inspected pattern, such as density and line width, but also the particular type of manufacturing process.

Accordingly, an inspection recipe to be used for the visual inspection tool described next is to be assigned for each type of pattern inspected, such as density and line width, and for each manufacturing process.

Therefore, a first embodiment of processing flow of the optical-conditions selection and assignment performed on the basis of optical conditions assignment criteria via the operation control unit 26 by use of the input device 25 before inspections are actually conducted is described below using FIG. 3.

First, in step S301, the operation control unit 26 displays at the display 27 the screen 500 shown in FIG. 5, receives the N number of sets of optical conditions assigned and registered via the input device 26, and stores the optical conditions into the storage device 24. An example in which No. 3 is input as the identification number of the optical conditions to be assigned is shown in FIG. 5. Examples of the optical conditions to be assigned are the type of detector 13 (camera), a pixel size (this depends on a particular magnification of the detector), a wavelength filtering value, a spatial filtering value, an ND filtering value, an aperture stop value, the type of light source (lamp or laser), and a focus offset quantity. Of course, the optical conditions assigned vary for the SEM type.

Next, in step S302, the above-assigned optical conditions are sequentially modified. Furthermore, inspection parameters (inspection conditions) such as the defect judgment binary thresholds required for the defect detection unit 18, the denoising-filter size and at-edge sensitivity reduction parameter required for the pre-processing unit 16, and the thresholds required for the defect image processing unit 20 to perform real/false defect judgments based on attributes, are also assigned in step S302. In step S303, inspections are conducted by the defect detection unit 18. Whether a processing count of N has been reached is judged in step S304. If N is not reached, the count is incremented in step S305 and the inspections are further continued using the next optical conditions/inspection parameters. When the processing count reaches N, a defect OR file is created in step S306. Details of the defect OR file are described later. In step 307, the defect image extraction unit 19 calculates (computes) the attribute data (the characteristic value) of each defect candidate from a defect candidate portion image and a reference portion image to all defect candidates without overlapping (only of non-recounted defect candidates) by using this defect OR file, and the defect image processing unit 20 judges from the attribute data whether the each defect candidate is real or false defect.

The types of attribute data used for classification include: area of the each defect candidate portion, computed from the above images; a size of the each defect candidate portion, such as X-, Y-lengths; a grayscale level of the each defect candidate portion; a difference in contrast between the defect candidate portion image and the reference portion image; and pattern density of background of the defect portion.

During real/false defect judgment by the defect image processing unit 20, defects are automatically classified according to either a rule manually assigned beforehand using the above attribute data, or a judgment rule created from a database into which real and false defects are collected beforehand using the above attribute data. Based on classification results and previously assigned conditions selection criteria, conditions selections are performed in step S308. The conditions selection criteria here are conceivable to vary in type. For example, they may be conditions under which the largest possible number of defects are detected, in other words, conditions under which the highest possible sensitivity can be obtained, or conversely, conditions that minimize false defects at the sacrifice of a slight number of misses in defect detection. The above means that a mode with priority assigned to sensitivity, and a mode for minimizing false defects are at least provided as the conditions selection criteria described above. In addition to the above two modes, a mode in between may be provided. By implementing the above scheme, it is possible to automatically select the conditions under which the results that a manufacturing manager desires most are obtainable.

An embodiment showing the relationship of a defect OR file is shown in FIG. 4A. The defect OR file is a file comparing both the results obtained by repeating defect detection a plurality of times (N number of times: in FIG. 4A, 3 times) and the defect candidates detected under different conditions, then judging from defect coordinates, sizes, etc. whether the defect candidates are the same, and identifying (showing) all defect candidates without overlapping (only non-recounted defect candidates) which were detected during N number of inspections. Although the embodiment shown in FIG. 4A indicates that 130 defects (401), 52 defects (402), and 100 defects (403) were detected during three inspections each different in optical conditions, the defects that were repeatedly detected are included in each count of real defects, as shown in FIG. 4B.

On the basis of the defect OR file, the operation control unit 26 can therefore display all defect candidates without overlapping (only defect candidates) at the display 27 and review them all at once. As a result of real/false defect judgment during a subsequent review, the defect counts ($\alpha$) during the respective inspections are, as shown in FIG. 4B, 100 pcs (404), 50 pcs (405), and 90 pcs (406), and the total defect count, except for recounted defects, is 120 pcs (407). If it is supposed that this total count denotes all defects present on the sample 1, the number of misses ($\beta$) is 20, which is the smallest in the total defect count of 120 pcs. This indicates that defects as many as 100 can be detected and thus that sensitivity becomes a maximum. As sensitivity is increased in this way, a false-defect count ($\gamma$) increases to 30 pcs and an error count ($\beta+\gamma$) increases to 50 pcs (408).

Under optical conditions 2, the number of misses ($\beta$) is 70, the largest in the total defect count of 120 pcs, which indicates that only 50 defects can be detected and thus that sensitivity becomes a minimum. As sensitivity is reduced in this way, a false-defect count ($\gamma$) decreases to 2 pcs and an error count ($\beta+\gamma$), a large majority of which is accounted for by the misses, becomes 72 pcs (409).

Under optical conditions 3, the number of misses ($\beta$) is 30, which is relatively small in the total defect count of 120 pcs. This indicates that 90 defects can be detected and thus that sensitivity takes an approximately medial value. As sensitivity is improved to an approximately medial value in this way, a false-defect count ($\gamma$) becomes 10 pcs and an error count ($\beta+\gamma$) including the misses takes a value of 40 pcs (410).

For example, if the error count is based on optical conditions 1, when the number of misses is taken as 0, the number of detection errors can be controlled to 30 under inspection conditions 1, 52 under inspection conditions 2, or 20 under inspection conditions 3.

Also, for example, if "Maximum number of real defects detected" that yields maximum sensitivity is previously assigned as the basis for selection of optical conditions, optical conditions 1 which minimizes the number of misses and maximizes both the number of defects and the number of false defects will be selected. Similarly, if "Minimum number of false defects detected" that yields minimum sensitivity is assigned beforehand, optical conditions 2 which creates many misses but minimizes the number of false defects will be selected, or if "Minimum number of false defects detected and misses" that yields approximately medial sensitivity is assigned beforehand, optical conditions 3 which controls both the number of misses and the number of false defects to an approximately medial value will be selected. In this way, optical conditions 1 is selected for a target pattern for which nanoelectronic-level defects must not be missed, optical conditions 2 is selected for a target pattern for which a slight number of nanoelectronic-level defects are permitted to be missed but false defects (detection errors) must be minimized, or optical conditions 3 is selected for a target pattern somewhere in between the above two patterns.

An example of a criteria assignment screen for selecting conditions is shown in FIG. 4C. In this example, on a displayed assignment criteria list 411, a "Maximum Sensitivity" check (radio) button 412 is selected.

An embodiment of an optical condition assignment screen is shown in FIG. 5.

First, the identification number of the optical conditions to be assigned is input to a box 501. If, as shown in FIG. 29, the inspection tool has a plurality of image acquisition means as detectors 13A and 13B, the type of camera to be used under the above-selected conditions is selected using a means such as a pull-down menu 502. After this selection, a pixel size, filters (if provided), an aperture, the type of light source, and a focus offset quantity for assigning an optimum position for inspection 509 are selected using means 502, 503, 504, 505, 506, 607, 508, 509, respectively. If the assigned data is really desired data, an "OK" button 510 is pressed to save the data. If the data is not to be saved, a "Cancel" button 511 is pressed. A plurality of sets of optical conditions are assigned by repeating the above procedure for each set of conditions. For example, for the ND filter required for adjustment of illumination light intensity, optical conditions may be automatically selected, instead of being manually selected, so as to allow a desired grayscale level to be obtained according to a particular grayscale level of the image acquired.

Figure 3:
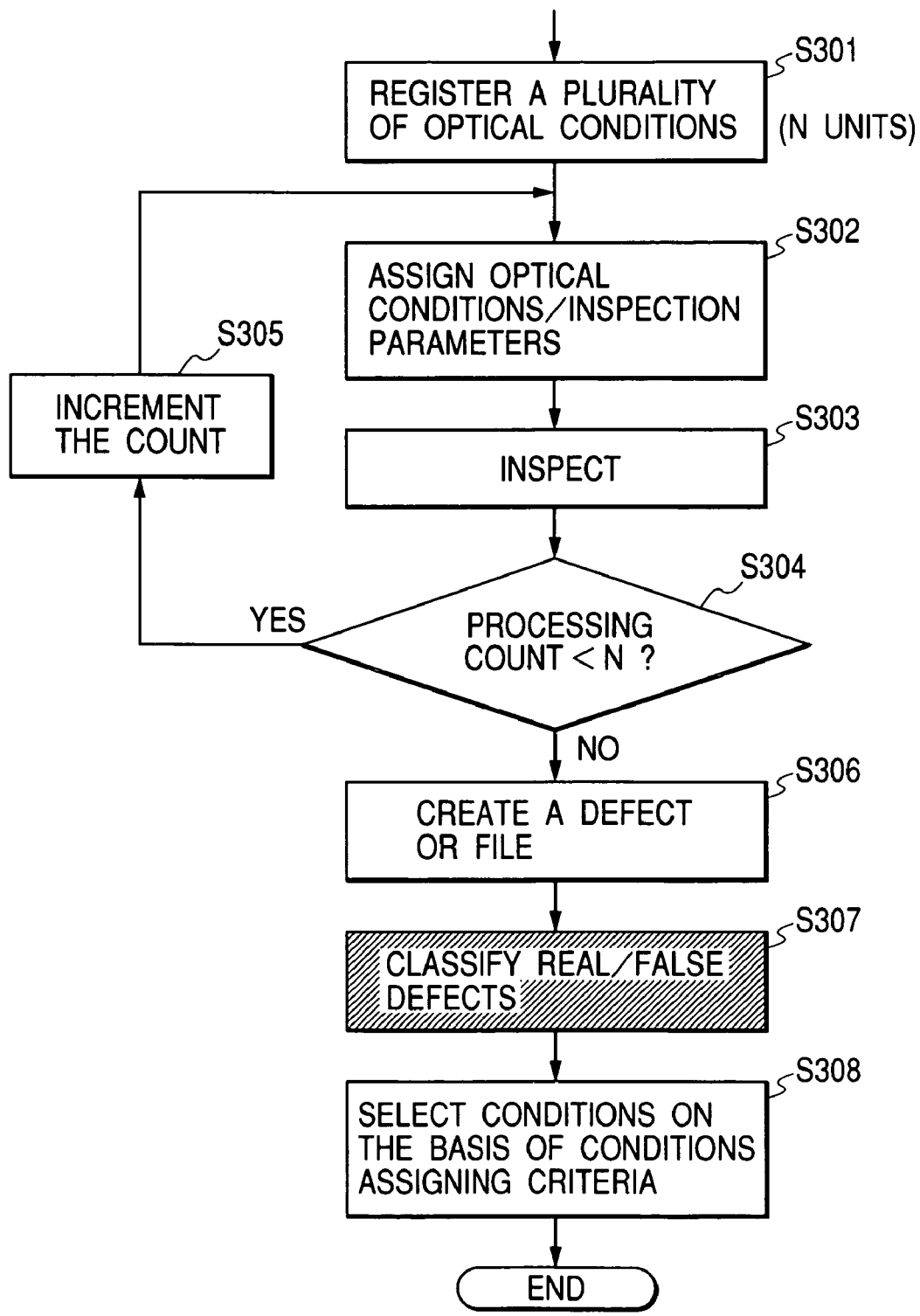
FIG. 3 is a flowchart showing an embodiment of assignment of image acquisition parameters (image acquisition conditions: optical conditions) as an inspection recipe in the present invention.

An embodiment of a confirmation screen concerning the selection of optical conditions is shown in FIG. 6, wherein the final optical conditions automatically selected as a result of processing in FIG. 3 are listed on screen 601. If the data assignments displayed on this screen are correct, a press of an "OK" button 602 saves the assignments. If the assignments are not to be saved, a "Cancel" button 603 is pressed. A press of a "Standard" button 604 assigns the data previously registered as defaults in the inspection tool. A press of a "Re-Set" button 605 to restart from the beginning of assignment returns control to processing shown in FIG. 5 and repeats once again the flow shown in FIG. 3.

Next, the procedure for assigning an inspection recipe, which comprises optical conditions and inspection conditions, by assigning desired inspection parameters (inspection conditions) after selecting/assigning desired optical conditions, is explained below using FIG. 7. First, initial inspection parameter data is assigned in step S701. Such high sensitivity as represented by, for example, an inspection threshold 803 in FIG. 8A, is assigned as an initial value so that both real and false defects will be included in inspection results. In step S702, this inspection parameter is used to execute inspection, and in step S703, the defects detected are classified into real defects and false defects. The classification may be visually set in a manual mode with a defect portion image (or the like) being displayed at the display 27, or may be automatically set using an automatic defect-classifying function of the defect image processor 20. The automatic defect-classifying function automatically classifies defects according to judgment rules by using the attribute data earlier herein. In step S704, classification results are used to adjust parameters automatically in the manner described later.

When the appropriateness of assignment results is to be confirmed, obtained parameters are used to perform inspections as test inspections in step S705, and then whether a detected defect is a real or false defect is confirmed by being visually reviewed in step S706. An inspection recipe is thus assigned in step S707. A series of assigning operations can be completely automated by assigning fixed or automatically assigned data in initial-data assigning step S701, performing real/false defect classification step S703 in an automatic mode, and skipping visual reviewing step S706.

An embodiment of automatic parameter adjustment is shown in FIG. 8A. This figure shows an embodiment of displaying the graph used to assign the judgment binary thresholds required for the defect detection unit 18. On this graph, real defects 801 and false defects 802 are separately plotted on the basis of classification results, with thresholds taken on a horizontal axis, and the number of defects detected with the thresholds, on a vertical axis. In short, the number of defects detected with each threshold is a product of a real-defect count and a false-defect count. During inspection, the operation control unit 26 can create this graph by retaining the information stored within the defect image extraction unit 19, such as the maximum value of the contrast differences derived from defect inspection results. For example, if the threshold is lower with respect to the differential image between a defect image and a reference image, defects and false defects are both detected in greater numbers and the total defect detection count becomes a maximum with the inspection threshold 803 assigned as an initial value (data) in FIG. 7.

As with optical conditions, thresholds are selected in accordance with the criteria assigned beforehand using such assignment screen as shown in FIG. 4C. More specifically, a high threshold A 804 is selected for reduced sensitivity which minimizes a false-defect count, a low threshold C 806 for increased sensitivity which maximizes a defect count (but, including a minimum number of false defects), or a median threshold B 805 for an medial count of (real defects+false defects).

Furthermore, a plurality of parameters may be assigned simultaneously. An embodiment of displaying the graph used to assign the thresholds required for the defect image processing unit 20 to identify real/false defects is shown in FIG. 8B. On this graph, the maximum values of the contrast differences between defects, and defect areas are plotted on a horizontal axis and a vertical axis, respectively, for each defect detection category. As with straight lines 807 and 808 shown in FIG. 8B to denote thresholds, a boundary line (threshold) between real and false defect images is difficult to draw in terms of area or maximum contrast difference only. However, it is possible to draw, for example, a boundary line 809 not including false defects, or a boundary line 810 for detecting a maximum number of defects, or drawing, for example, a quadratic curve 811 for separating real defects and false ones is likely to be possible. These can be implemented by plotting on vertical and horizontal axes the parameters that allow boundary lines to be well drawn.

Figure 7:
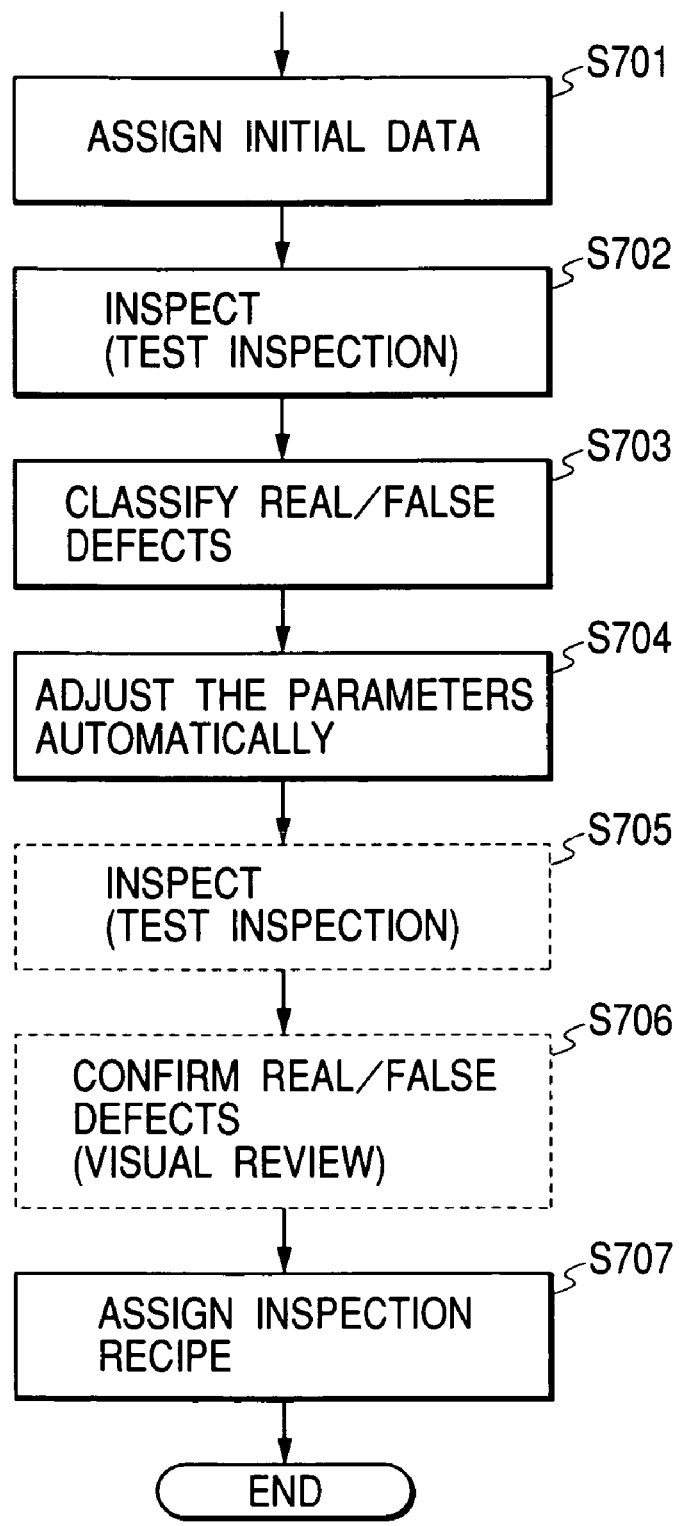
FIG. 7 is a flowchart showing an embodiment of assignment of inspection parameters (inspection conditions) as an inspection recipe in the present invention.
Figure 9:
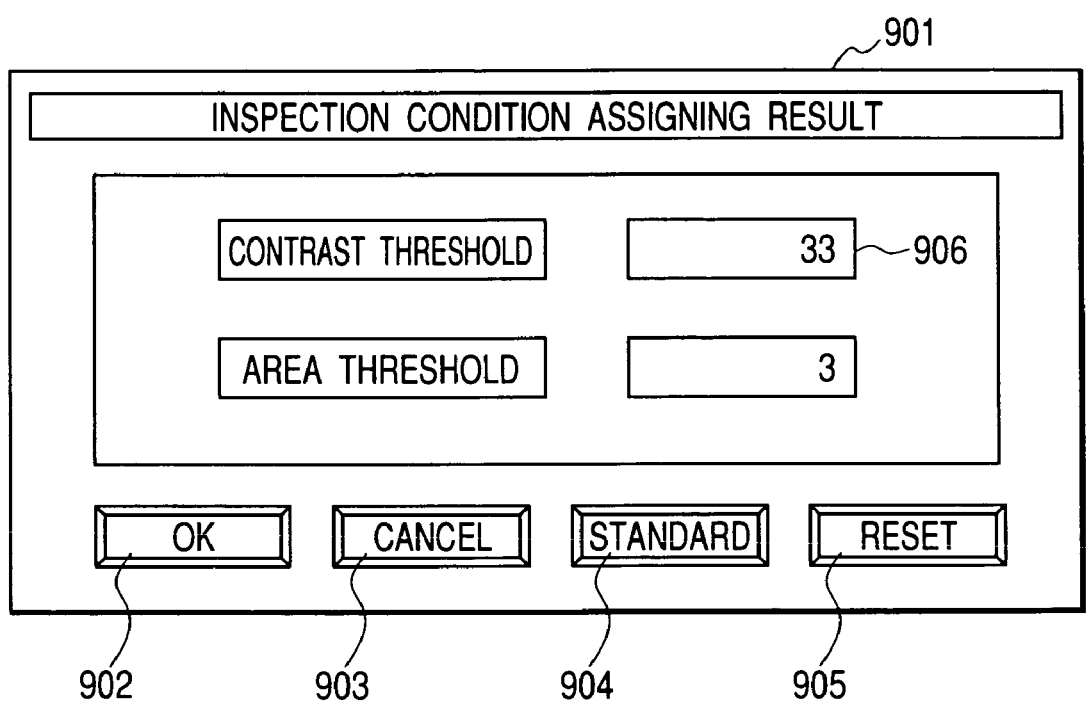
FIG. 9 is a view showing an embodiment of an assignment result display screen relating to inspection parameters (for example, judgment thresholds) in the present invention.

An embodiment of a confirmation screen concerning the selection of inspection conditions is shown in FIG. 9, wherein the final inspection conditions automatically selected as a result of processing in FIG. 7 are listed on screen 901. If the data assignments displayed on this screen are correct, a press of an "OK" button 902 saves the assignments. If the assignments are not to be saved, a "Cancel" button 903 is pressed. A press of a "Standard" button 904 assigns the data previously registered as defaults in the inspection tool. A press of a "Re-Set" button 905 returns control to processing shown in FIG. 4C and repeats once again the flow shown in FIG. 7. Alternatively, data may be directly input to an input box 906.

Although an inspection conditions assignment method based on two defect categories (real defects and false defects) has been described above, conditions may likewise be assignable even when more categories are added.

Figure 10:
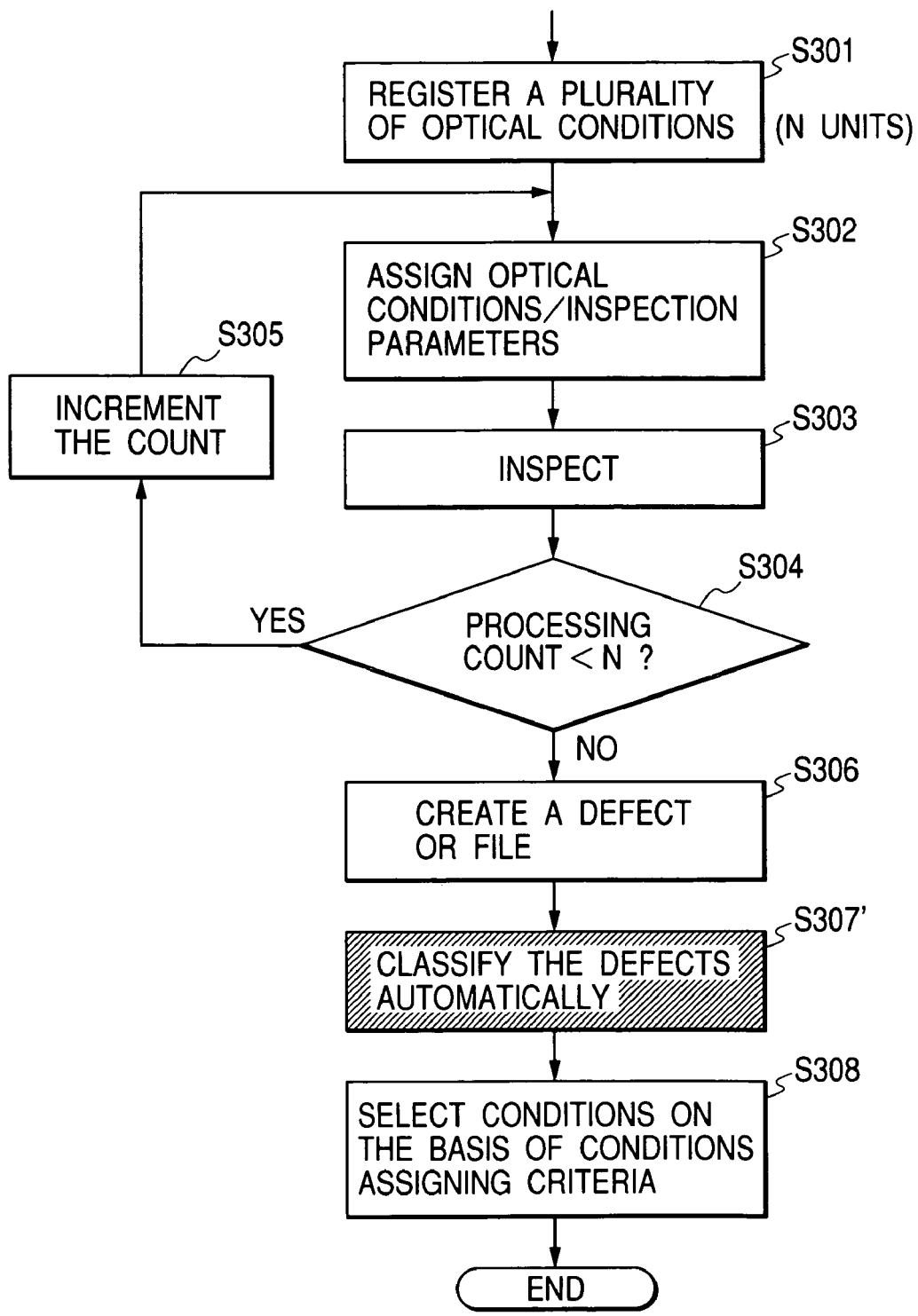
FIG. 10 is a flowchart showing another embodiment of assignment flow of image acquisition parameters as an inspection recipe in the present invention.

Next, a second embodiment of processing flow of the optical-conditions selection and assignment performed on the basis of optical conditions assignment criteria via the operation control unit 26 by use of the input device 25 before inspections are actually conducted is described below using FIG. 10. In terms of basic processing, the second embodiment is the same as the first embodiment shown in FIG. 3. The second embodiment, however, differs in a defect-classifying step S307' in which more detailed defect classification than that of the first embodiment is carried out. A method of assigning conditions when defects are classified in further detail in the operation control unit 26 is described below.

An embodiment of detection result display in this scheme under the control of the operation control unit 26 is shown in FIG. 11. In this figure, defect counts for each category are displayed for the plurality of sets of optical conditions 1101 that were previously assigned using a method similar to the above-mentioned method. In this figure, in addition to real and false defects, all defects are classified into four more types 1102: defects 1 (e.g., particles), defects 2 (e.g., SHORT), defects 3 (e.g., scratches), and unclear defects.

Figure 12:
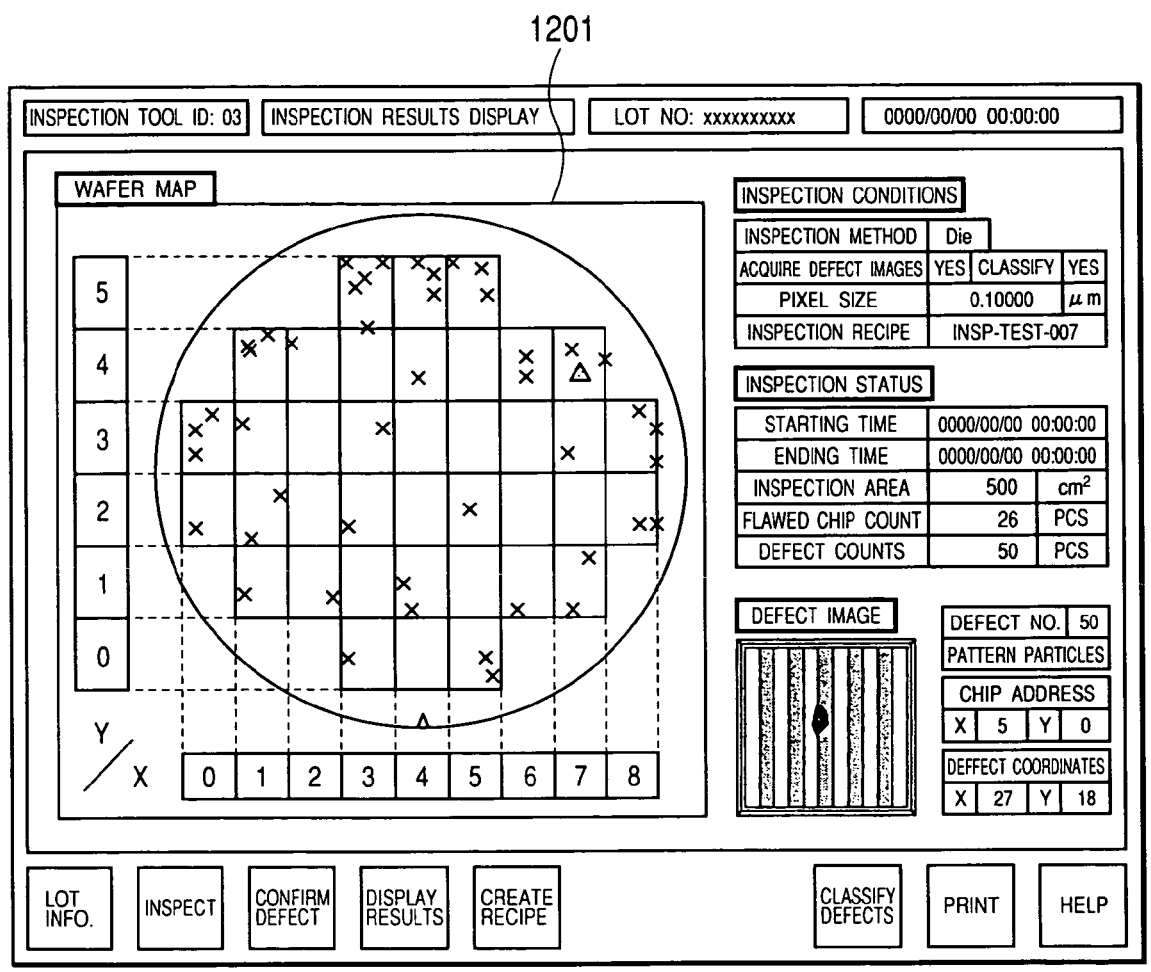
FIG. 12 is a view showing an embodiment of a defect classification result display screen pertaining to the present invention.

In these columns, more specific defect names may be displayed. The ON and OFF symbols under the defect names indicate whether defect symbols are to be marked on such a defect distribution map 1201 of a wafer image as shown in FIG. 12, i.e., whether a particular defect is necessary to the user. Also, an ON-displayed total defect count 1103 and an OFF-displayed total defect count 1104 are displayed under the columns located at right. A criterion for selecting optical conditions is assigned beforehand and the optical conditions matching the criterion are selected. For example, if the total number of necessary defects is assigned as the criterion, i.e., if the conditions under which a certain ON total becomes the largest of all five types are assigned, optical conditions 2 that gives the largest ON total (highest sensitivity to defects 1, 2, and 3) are selected. If the conditions under which a certain OFF total becomes the smallest of all five types are assigned (i.e., both the number of false defects causing chips to be misjudged to be flawed, and the number of unclear defects become a minimum), optical conditions 5 is selected. If the conditions under which a detection count of defects 2 of a certain type (for example, a category of SHORT defects which are killer defects) becomes the largest of all five types, optical conditions 1 is selected.

Figure 13:
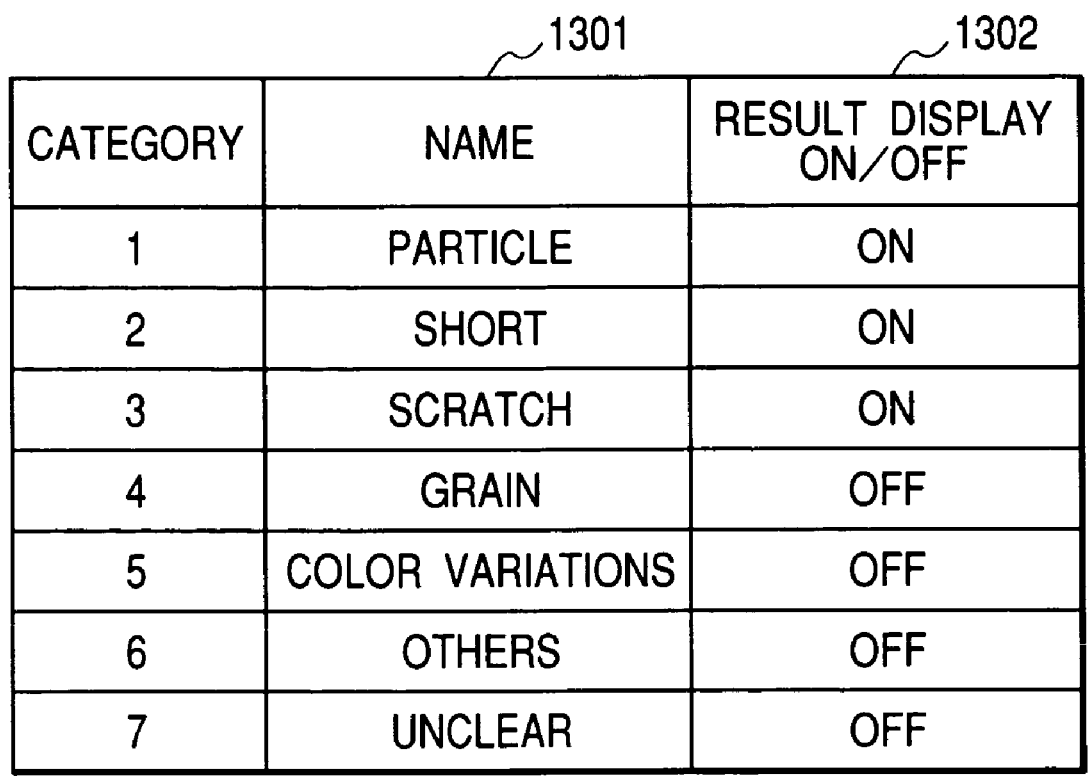
FIG. 13 is a diagram showing an embodiment of defect classification conditions listing in the present invention.

An embodiment of listing the defect classification conditions assigned in the operation control unit 26 is shown in FIG. 13. A defect name 1301, result display ON/OFF 1302, etc. are assigned to each defect category beforehand. Assignment of result display ON/OFF is used to specify whether defect symbols are to be marked on a wafer map as described above, or as shown in FIG. 14, to change the shape or color of defect symbols if the symbols are to be marked on a wafer map 1401. Inspection conditions 1402 including an inspection recipe, an inspection status 1403, and wafer map display conditions 1404 are also displayed simultaneously in FIG. 14. In addition, result display ON/OFF may be assigned on this display of the display conditions 1404. Furthermore, an ID number 1405 of the inspection tool, a status 1406 of the display screen, a lot number 1407 of the wafer to be inspected, and wafer-processing time or inspection time information 1408 are displayed on this display screen. Since all defects detected will be classified, there is no need to estimate the type of defect if it is missed in classification, and a defect distribution status can be analyzed accurately.

Figure 15:
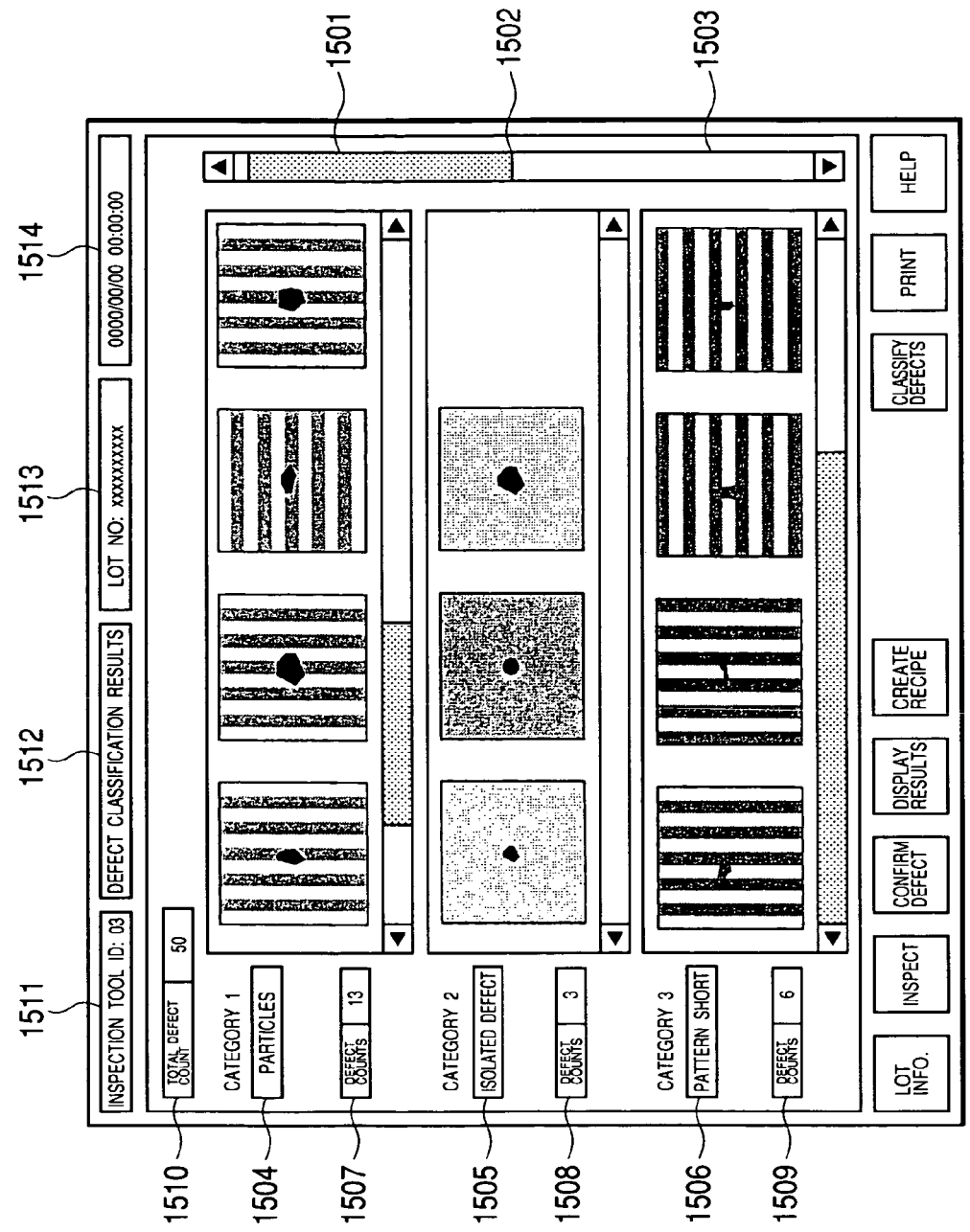
FIG. 15 is a view showing yet another embodiment of a defect classification result display screen pertaining to the present invention.

An embodiment of a display screen on which the results of defect classification by the operation control unit 26 or the like are displayed at the display 27 is shown in FIG. 15.

In this embodiment, images 1501 to 1503 of the defects which were classified according to category are displayed, together with information of categorized-defect types (foreign particle 1504, isolated defect 1505, and short-circuit defect or pattern short 1506), information of respective detection counts 1507 to 1509, and a total defect detection count 1510, on the screen. An ID number 1511 of an inspection tool which was used for defect inspection, a display screen status 1512, a lot number 1513 of an inspected wafer, and wafer-processing time or inspection time information 1514 are also displayed.

Next, another embodiment of identifying a real defect and a false defect ascribable to the tool is described below using the processing flowcharts shown in FIGS. 16 to 18. The identification method in this embodiment is such that inspection is repeated a plurality of times under the same conditions and then whether a defect has detection reproducibility, i.e., how often the defect is likely to be detectable is judged to identify whether a detected defect candidate is a real defect or a false defect. If the defect candidate is a real defect, this defect will be detected each time or a plurality of times. Conversely, for example, a false defect that arose from some type of image acquisition trouble such as a change in illumination light intensity or improper traveling of a stage will not be repeatedly detected unless a similar imperfection occurs in terms of image acquisition conditions.

Figure 16:
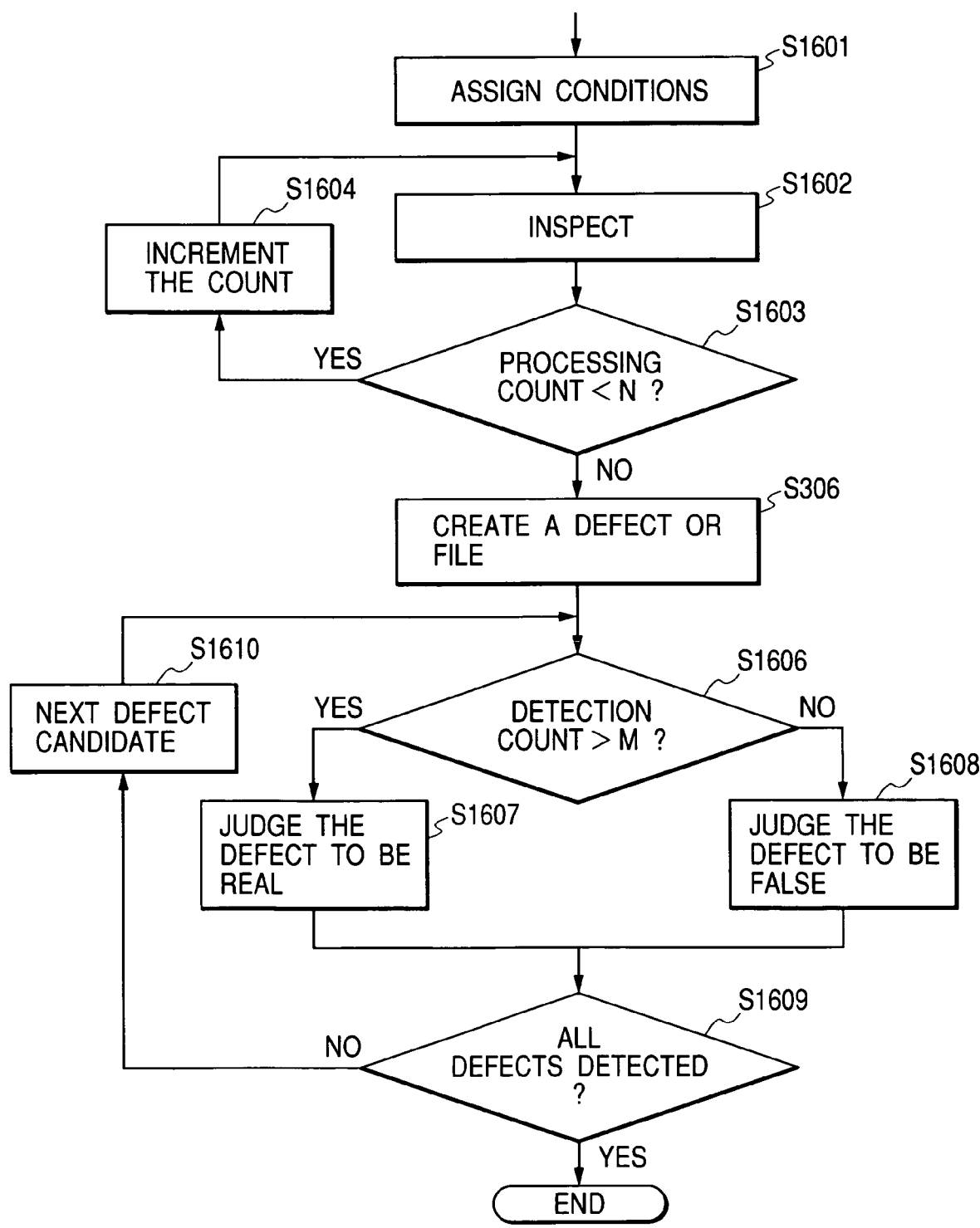
FIG. 16 is a view showing an embodiment of the processing flow encountered during defect judgment in the present invention.

For example, in the operation control unit 26, as shown in FIG. 16, one set of optical conditions is first assigned in step S1601. In this step, an inspection count N and a minimum detection count M that becomes the basis for judging that only defect candidates repeatedly detected a certain number of times or more during the N number of inspections are real defects are also assigned. Inspection is executed in step S1602 and whether a processing count has reached N is judged in step S1603. If N is not reached, the count is incremented in step S1604 and the inspection is further continued under the same conditions. When the processing count reaches N, a defect OR file is created in step S306 similarly to the embodiment earlier described herein. How often a defect candidate was detected during an N number of inspections is checked in step S1606, and in step S1608, if M is reached or exceeded, a particular defect candidate is judged to be a real defect, or if M is not reached, the defect candidate is judged to be a false defect. Whether all defect candidates have been judged is checked in step S1609 and judgment on the next defect candidate is continued until judgment on all defect candidates has been completed.

A detection error may be caused by an optical detection error due to, for example, lens aberration. Lens periphery, in particular, is prone to suffer aberration and false defects tend to result therefrom. In such a case, the optical conditions can be modified by shifting a viewing position.

Figure 17:
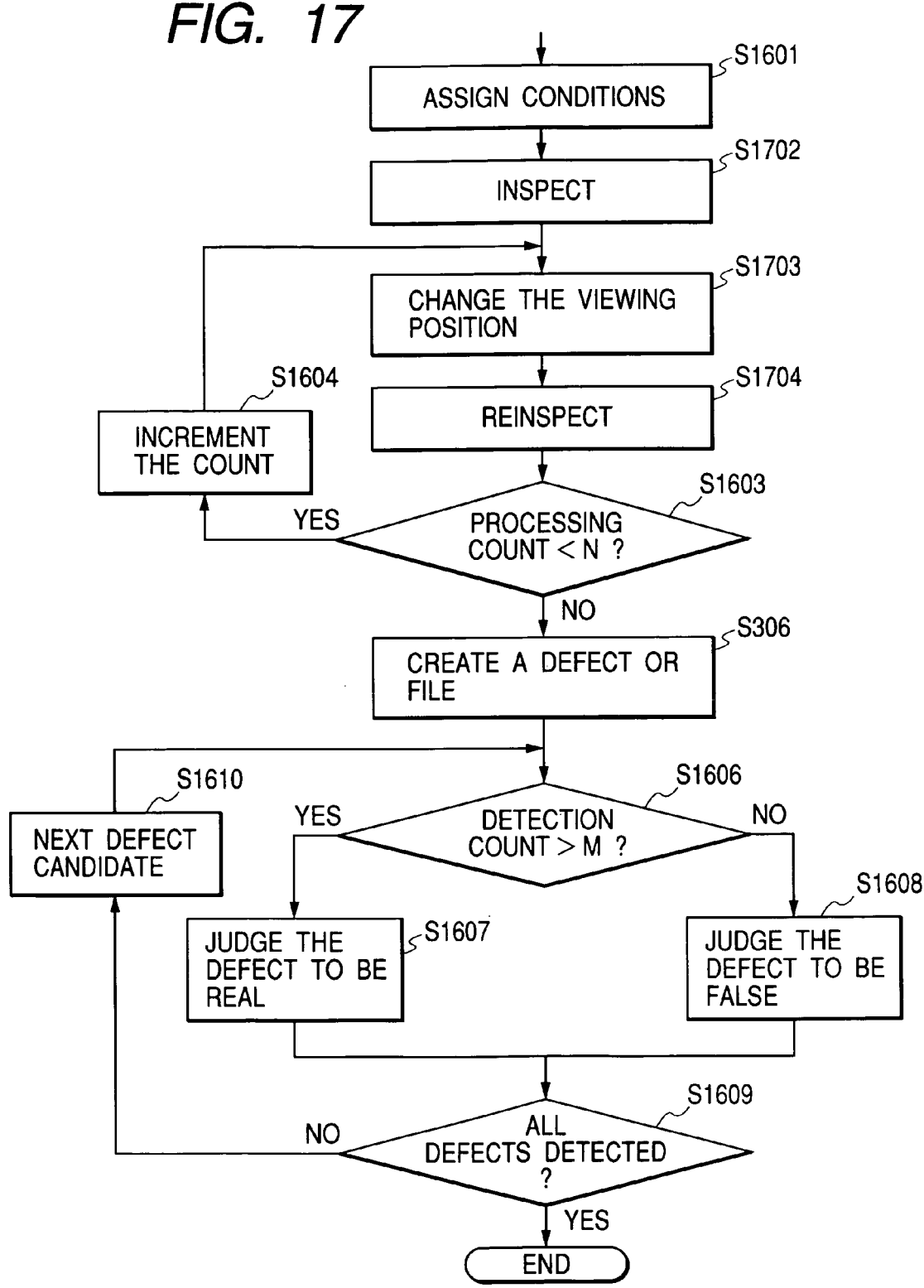
FIG. 17 is a view showing another embodiment of the processing flow encountered during defect judgment in the present invention.
Figure 18:
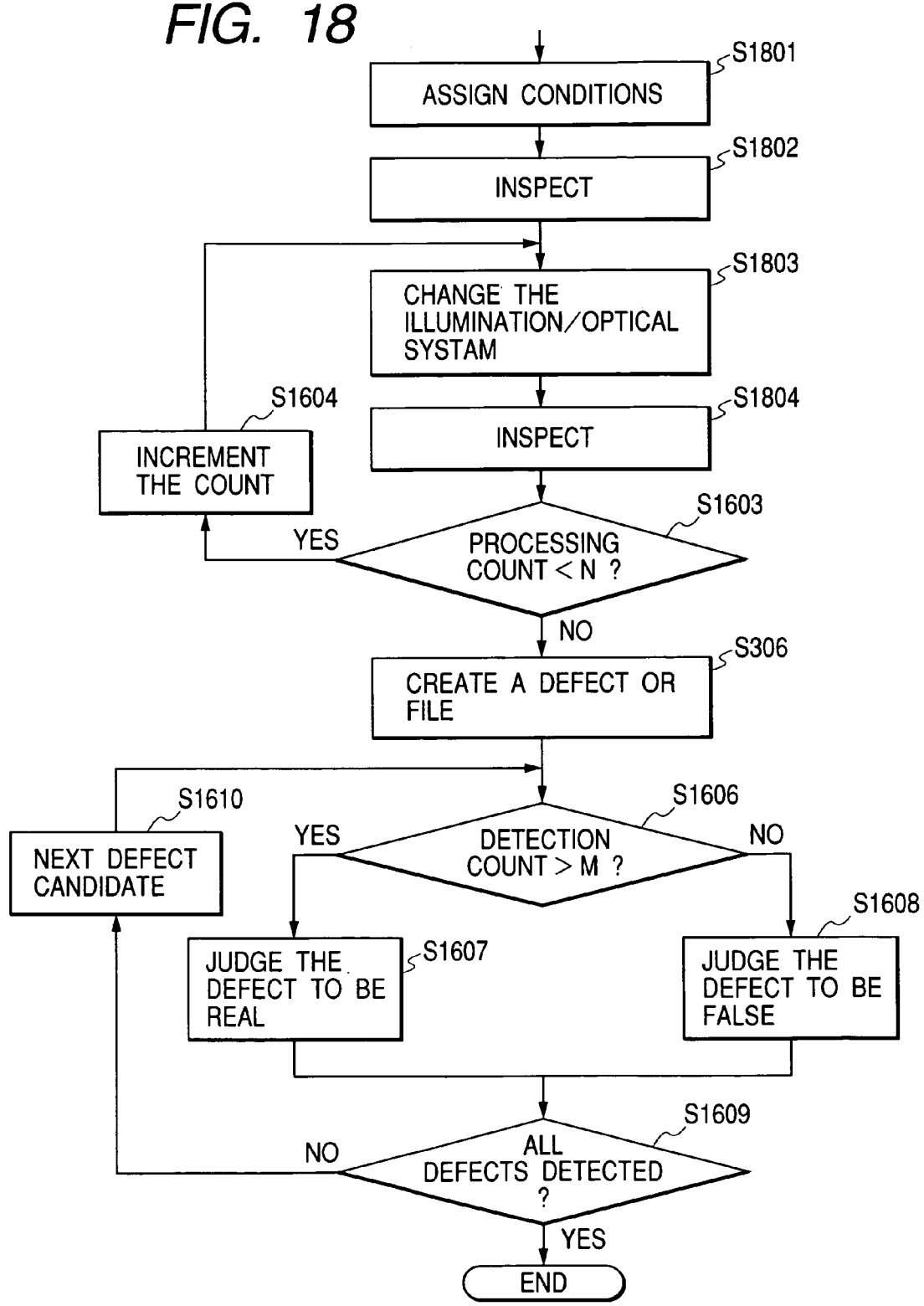
FIG. 18 is a view showing yet another embodiment of the processing flow encountered during defect judgment in the present invention.

Processing flow is shown in FIG. 17. This flow differs from the flow of FIG. 16 in that: after inspection in step S1702, the viewing position is changed during reinspection to acquire a new image in step S1703, then a plurality of inspections are conducted in step S1704, and a real/false defect judgment is conducted in step S1606 similarly to the judgment in FIG. 16. Another method may be by executing reinspection after the viewing position has been moved to where the best optical conditions can be obtained (for example, a center of the field-of-view), and then judging the defect candidate, only if detected even so, to be a real defect, or judging the defect candidate to be a false defect if not detected during the reinspection. Yet another method may be by previously storing into, for example, the storage device 24, the viewing position existing when, for example, the defect detection unit 18 detects defect candidates, activating the mechanism control unit 22 in order for movement (traveling) of the stage 2,3 to be controlled only for the defect candidates detected around the field of view, and conducting a reinspection by acquiring new images in the center of the field-of-view via the optical system 7 and the detector 13. Thus, the optical conditions selected and assigned as an inspection recipe include a within-field detection position concerned with lens aberration.

Next, a method of eliminating any effects of color variations due to thin-film interference or the like is described below. This method is also basically the same as the aforementioned methods. The processing flow in this method is shown in FIG. 18. When a short-wavelength illumination step S1801 that uses UV, DUV, or the like, is performed in an inspection step S1802, these wavelengths increase sensitivity, whereas they easily generate false defects due to thin-film interference. In order to confirm whether a detected defect candidate is a real defect, a different illumination system such as broadband white-light illumination is used in step S1803 to repeatedly inspect the defect candidate several times in step S1804. Although insusceptible to color variations, white-light illumination seems to reduce defect detection sensitivity below that obtainable during short-wavelength illumination, for which reason, assigning a high magnification or other measures are required so as to maintain high-sensitivity detection. The same also applies, even if the optical system is changed instead of the illumination system or simultaneously therewith. Thus, the optical conditions selected and assigned as an inspection recipe include an illumination wavelength and an image-forming magnification.

By repeating inspection several times as described above, defect detection accuracy and, at the same time, the reliability of defect detection can be improved, of course, when an inspection recipe comprising optical conditions and inspection conditions is to be created, and even during actual inspection.

Figure 19:
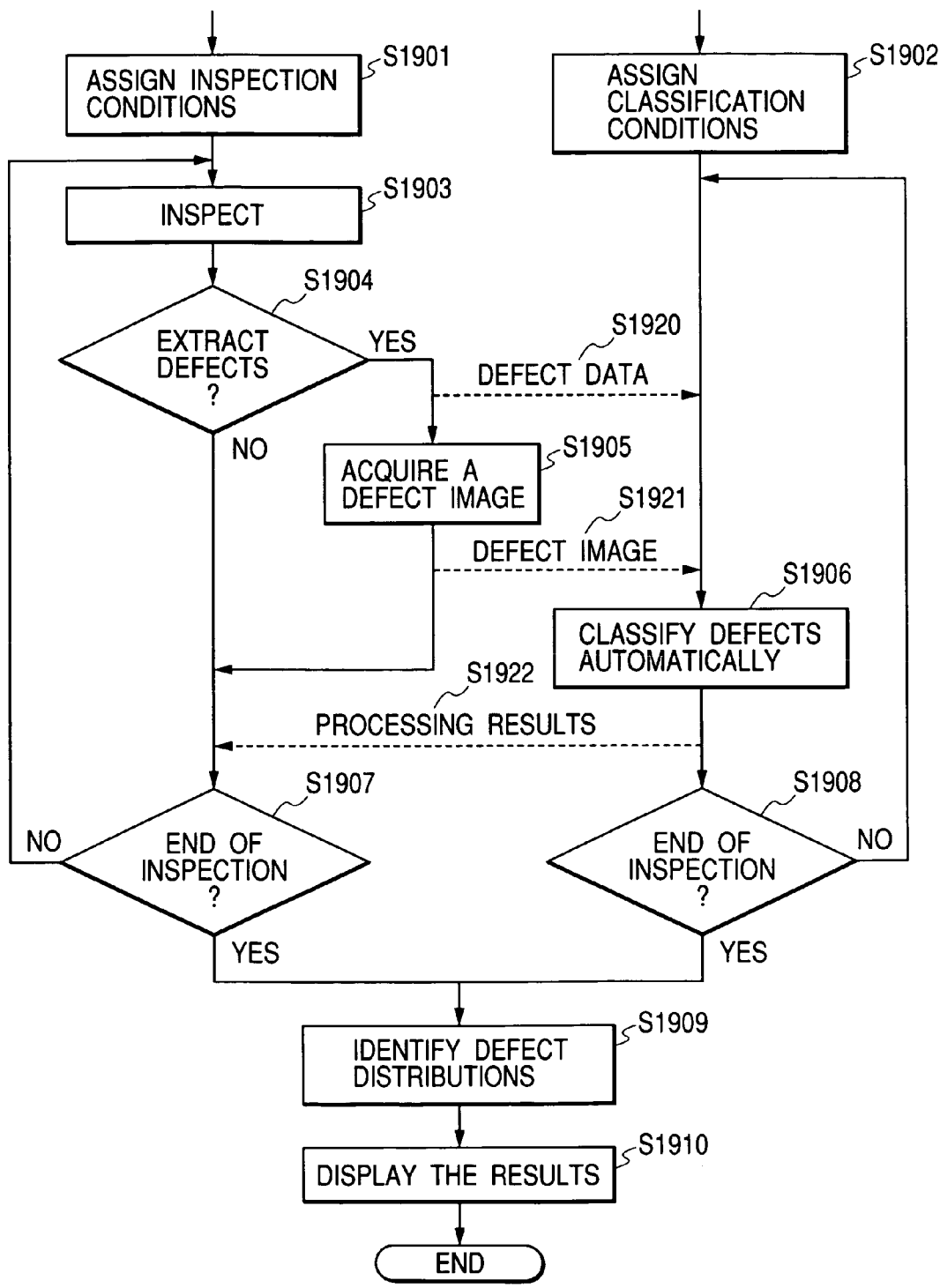
FIG. 19 is a view showing an embodiment of the processing flow encountered during defect classification in the present invention.

Next, the inspection flow applied to conducting automatic defect classification in the inspection tool (such as a visual inspection tool) after, as described above, an inspection recipe has been assigned, is described below using FIG. 19.

First, in step S1901, an inspection recipe that comprises the optical conditions, inspection parameters (inspection conditions), etc. required for inspection is assigned for a main body of the inspection tool. Classification conditions are assigned for an automatic defect classification (ADC) unit in step S1902.

The main body of the inspection tool inspects, in step S1903, an object to be inspected, this object being similar to a sample for which an inspection recipe has been assigned above, and then, for example, if a defect is detected by the defect image extraction unit 19 in step S1904, transfers defect data 1920 obtained as a result of the inspection, such as coordinates of the defective portion and area and size of the defect, to the ADC unit. For example, the defect image processing unit 20 acquires an image 1921 of the defective portion and, for comparative inspection, an image of a reference portion for the comparison, (in a suitable size) in step S1905 and transfers to the ADC unit the defect data and the images including the defect image, in step S1906. After receiving the defect data 1920 and the images 1921, the ADC unit computes attributes and the like, on the basis of the data and the images, automatically classifies the defect as a real/false defect from the results and previously assigned classification conditions in step S1906, and transfers classification results 1922 to the main body of the inspection tool.

Figure 14:
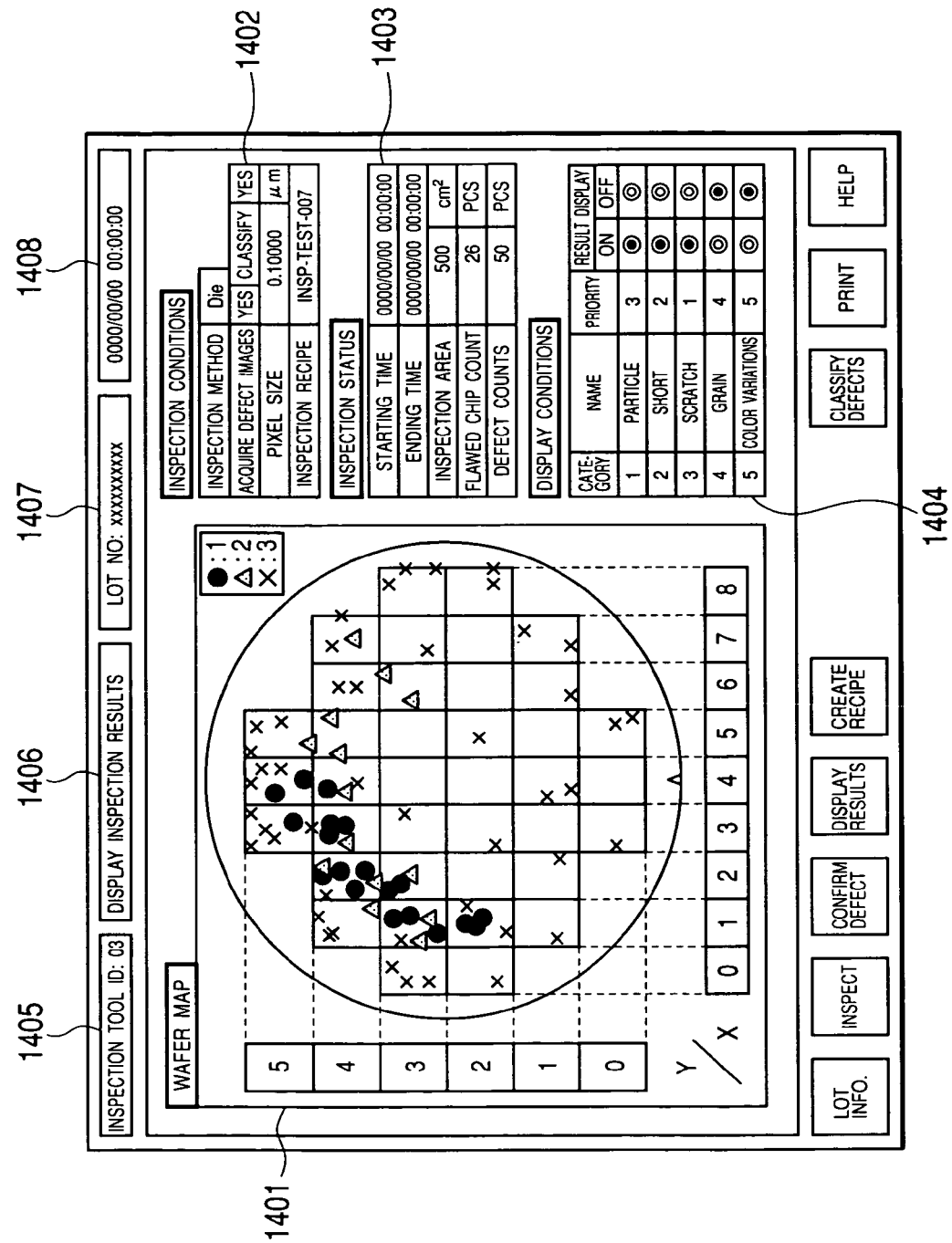
FIG. 14 is a view showing another embodiment of a defect classification result display screen pertaining to the present invention.

This procedure is repeated up to completion of the inspection, and when the inspection is completed in step S1907 or S1908, a distribution status of defects is identified in step S1909 on the basis of all obtained defect coordinates or for each defect category, by, for example, the distribution identifying unit 28. This process may be performed by the main body of the inspection tool or by the ADC unit. In step S1910, the results, after being obtained by the above process, are displayed on a display screen of either the main body of the inspection tool or the ADC unit, as shown in FIGS. 12, 14, and 15.

Figure 20:
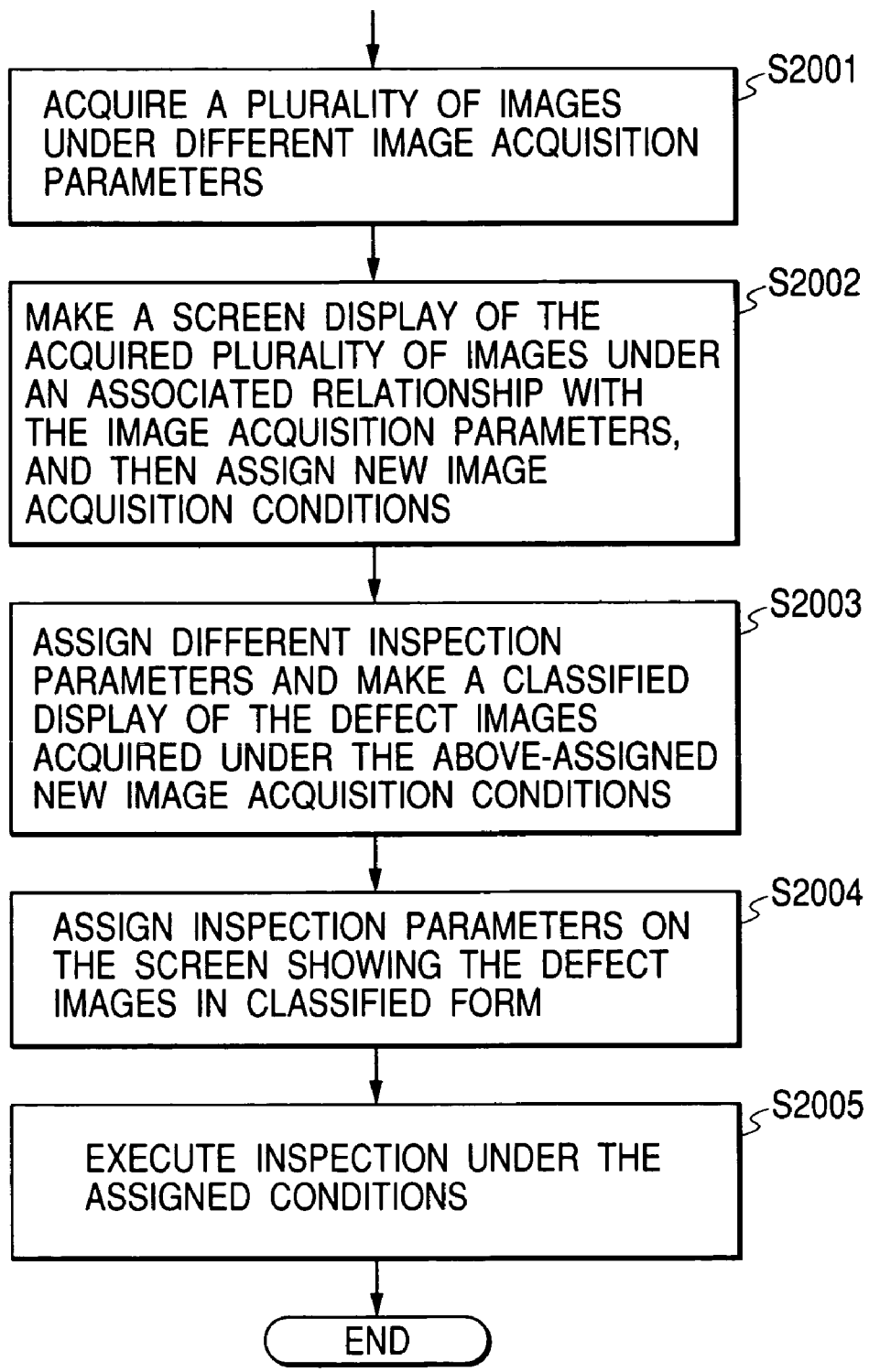
FIG. 20 is a diagram showing an embodiment of approximate flow of inspection according to the present invention.

Next, a description is given of a scheme for assisting image-acquisition condition assignment by acquiring images from one specified position under various image acquisition conditions and listing thus-obtained images on the screen. In the present invention, inspections are conducted under the inspection conditions assigned in accordance with such a flowchart as shown in FIG. 20. More specifically, first, the plurality of images that were obtained under various image acquisition conditions are displayed on the screen in step S2001. Then on the screen where the plurality of images are displayed, new image acquisition conditions are assigned in step S2002. Next, inspections under various inspection conditions are performed on the images that were obtained under the new image acquisition conditions, a plurality of defect images obtained under, and associated with, each set of above inspection conditions, are displayed on the screen in step S2003. In addition, on this display screen of the defect images, new inspection conditions (inspection parameters) are assigned in step S2004. These new inspection conditions are then used in step S2005 to inspect the wafers processed by production equipment.

Figure 21:
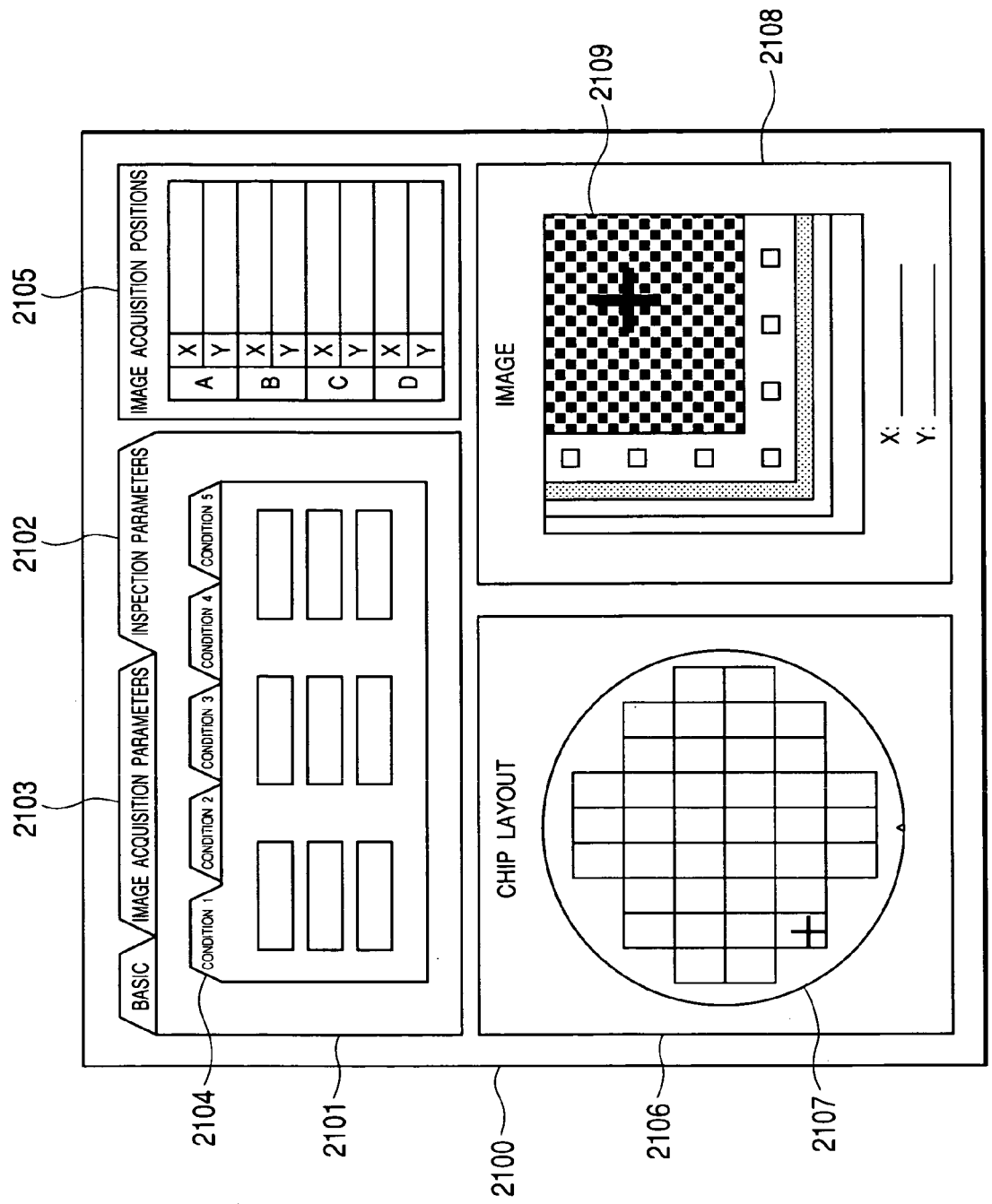
FIG. 21 is a view showing an embodiment of an inspection parameter assignment screen pertaining to the present invention.

FIG. 21 shows an inspection parameter assignment screen that is part of a user interface of the operation control unit 26. A user uses an input device 25 (such as a keyboard, a mouse, a joystick, or the like) to assign basic data (such as a product name of a wafer to be inspected, and process data), image acquisition parameters, image-processing parameters, an inspection region, and other data, on an assignment screen 2100 displayed at the display 27. These types of data are assigned via an inspection parameter assignment screen 2101 or an image acquisition conditions assignment screen 2102.

An example of the parameter assignment screen 2100 is shown in FIG. 21. The example in FIG. 21 indicates that an inspection parameter column 2102 is selected in a parameter assignment region 2102, in which case, a plurality of sets of conditions 2104 from conditions 1 to 5 can be assigned as inspection parameters. When an image acquisition parameter button 2103 is selected next, a plurality of sets of conditions on a screen from conditions 1 to 5 can be assigned as image acquisition parameters. Likewise, an image acquisition position can also be specified from an image acquisition position assignment region 2105 displayed on the assignment screen 2100. To specify an image acquisition position, if in-wafer coordinates of a desired acquisition position are known beforehand, the corresponding data can be input from the keyboard or the like. When a position is to be selected while viewing the image displayed at the display 27, a desired image acquisition position displayed as "+", for example, on a chip layout view 2107 displayed in a chip layout display region 2106, can be specified using, for example, the input device 25 such as a mouse. An image 2109 present in a neighboring region including the specified image acquisition position is then displayed in an image display region 2108.

Figure 22:
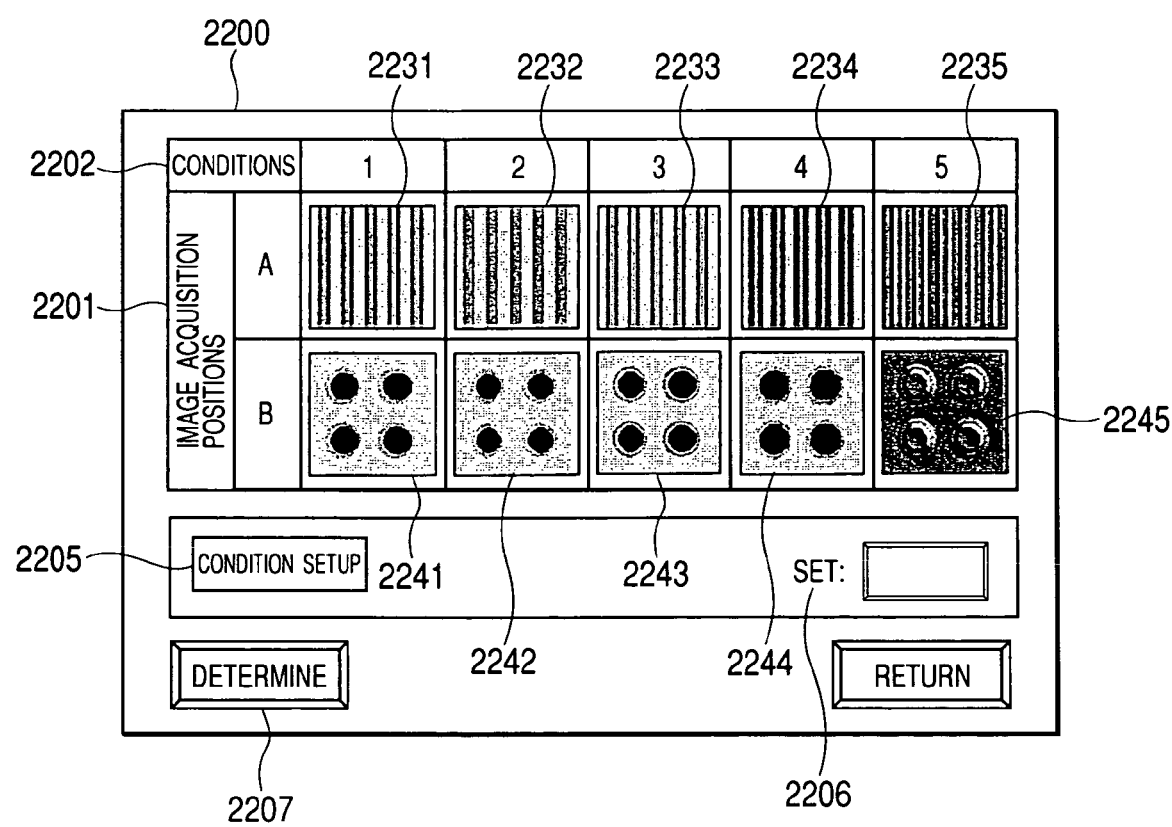
FIG. 22 is a view showing an embodiment of an acquired-image listing screen pertaining to the present invention.

An example in which a list of images present at the plurality of positions that were assigned using the above procedure is displayed under an associated relationship with respect to a respective plurality of sets of acquisition parameters is shown in FIG. 22. FIG. 22 shows an example of an image acquisition parameter assignment screen 2200. In this example, a plurality of sets of images 2231-2235 and images 2241-2245 that were acquired from the plurality of characteristic image acquisition positions A and B, respectively, by varying conditions 2002 with a plurality of sets of image acquisition parameters are displayed in a list form in an image acquisition position display field 2201. Such display allows images to be presented so that any differences in image state due to the differences in conditions can be easily identified.

Image acquisition conditions can be easily assigned in a conditions assignment section 2205 by selecting conditions suitable for defect detection, from the plurality of images displayed on the screen, and after assigning these selected conditions in an assignment field 2206, clicking a determination button 2207. When defect coordinates are known beforehand, the image acquisition conditions can be assigned more easily since input of the coordinates defines the conditions more strictly. Also, the images listed on the screen may be defect images detected as a result of inspection under each set of parameters.

If too many defects are detected and not all of them can be displayed on the screen 2200, the screen may be scrollable so as to allow display of all defects or sampling may be employed in order for them all to be displayed on the screen. The sampling may be able to take a variety of forms such as sampling in order of defect size for each set of conditions, random sampling, or sampling typical defects for each classification category when defect classification is also further desired. Comparison of detected defects in terms of coordinates also allows arranged display of images of the defects detected under all sets of conditions, or conversely, allows independent display only of each defect detected under one or two sets of conditions, for example. Display only of the defects detected under one set of conditions is considered to aid in judging whether the conditions are advantageous over other conditions.

Figure 23:
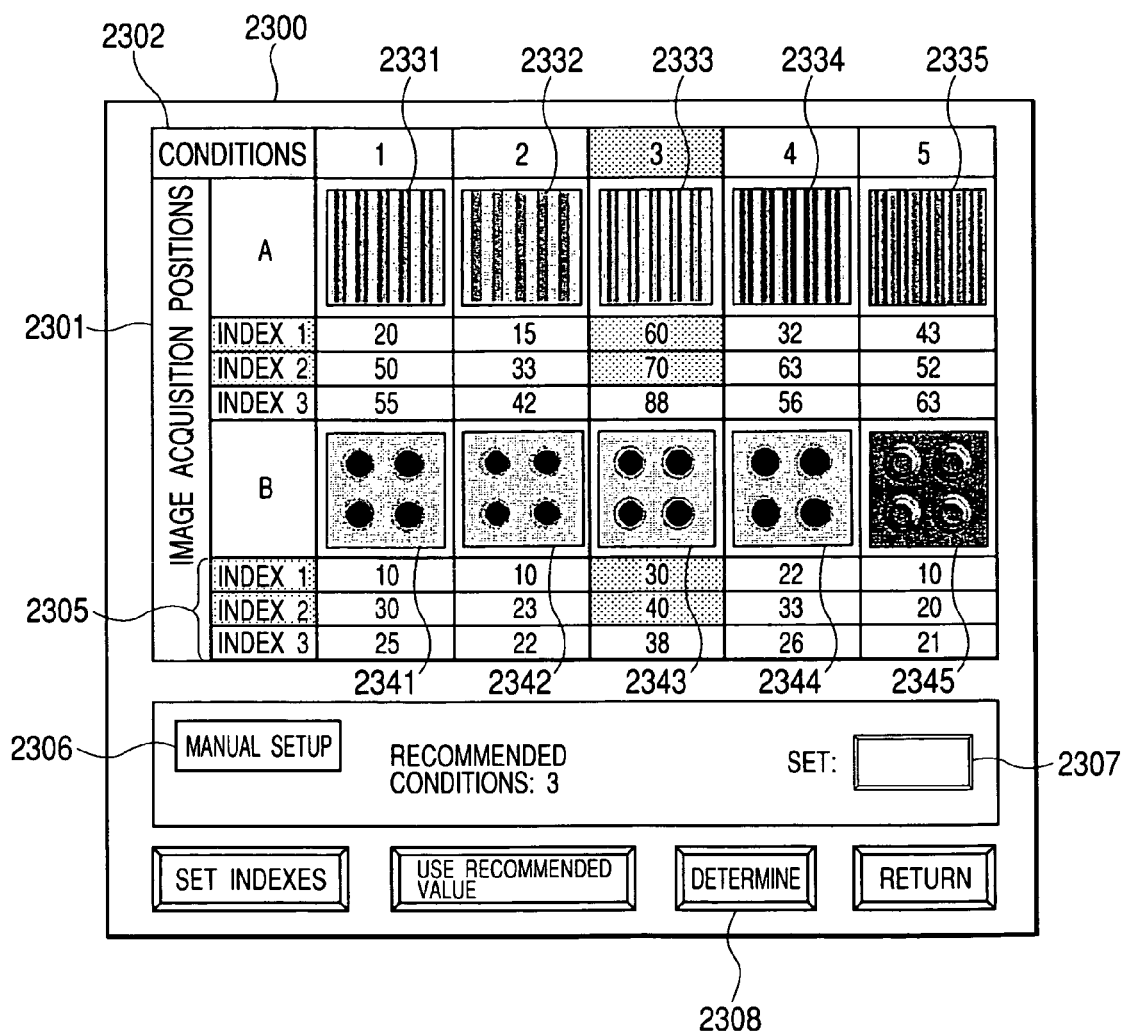
FIG. 23 is a view showing another embodiment of an acquired-image listing screen pertaining to the present invention.

As shown in FIG. 23, screen functions can also be more advanced to obtain a listing method. On a display screen 2300 shown in FIG. 23, in an image acquisition position display field 2301, in addition to list display of images 2331 to 2335 and 2341 to 2345 that were acquired by varying conditions 2302 from conditions sets 1 to 5 with a plurality of image acquisition parameters, an index display field 2305 is displayed to indicate whether a particular set of conditions are appropriate for defect detection. The indexes that can be used are, for example, image contrast, a differential value, a grayscale level, a standard deviation, and other statistics, and by quantitatively displaying, in image-associated form, one item selected from these indexes, quantitative evaluation becomes possible during selection of conditions.

It is also possible, after selecting several indexes beforehand, to automatically select the conditions under which these selected indexes each take a maximum (or appropriate) value. Displaying automatically selected conditions as recommended conditions or in highlighted form allows the operator to confirm the conditions more easily. The example in FIG. 23 indicates that recommended conditions are displayed in a manual assignment field 2306. The operator refers to the recommended conditions displayed in this field, and the images 2331-2335 and 2341-2345 for each set of conditions including the recommended conditions, determines the conditions to be assigned, and inputs the determined conditions to an assignment field 2307. After this, the operator clicks a determination button 2308, thus completing input of the conditions to be assigned.

Figure 24:
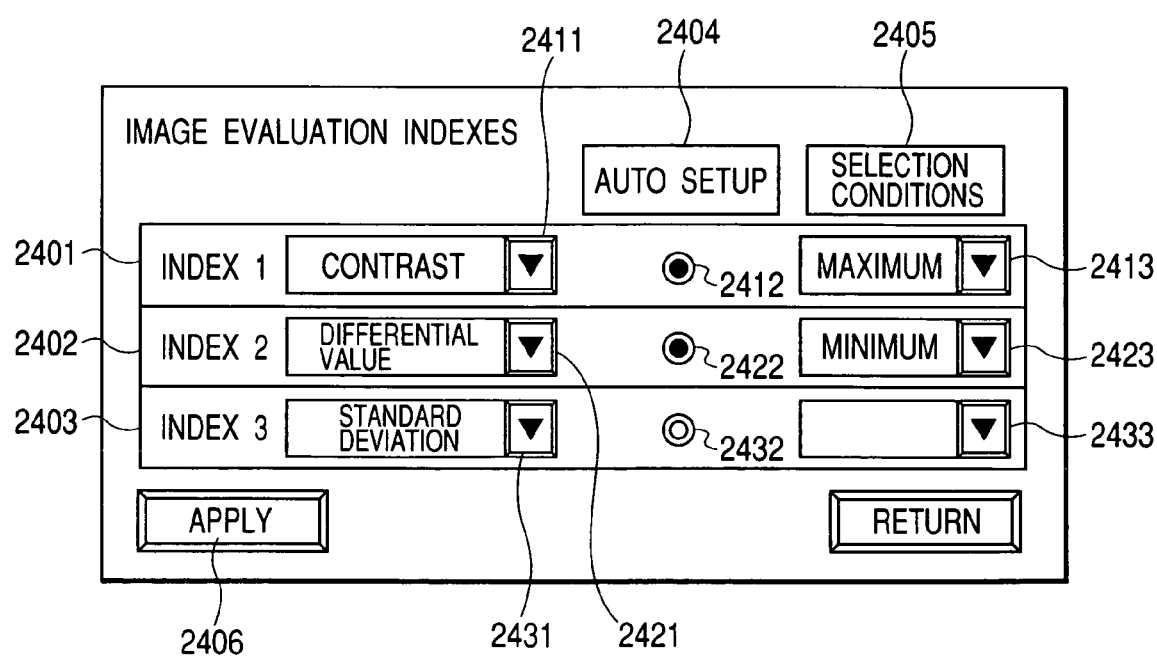
FIG. 24 is a view showing an embodiment of an image evaluation index assignment screen pertaining to the present invention.

An example of a screen for assigning an image evaluation index is shown in FIG. 24. Which of evaluation indexes 2401 to 2403 is to be used is assigned by being selected using any one of selection buttons 2411, 2421, and 2431 displayed on the screen. Also, automatic selection of the recommended conditions which uses a particular index is possible by ticking acquired-image selection/display check buttons 2412, 2422 and 2432 displayed under an ON/OFF-type automatic assignment button 2404, and after selecting the selection conditions of the ON-displayed indexes by use of the appropriate selection buttons (2413, 2423, 2433) under a selection conditions column 2405, clicking an application button 2406 on the screen.

Figure 25:
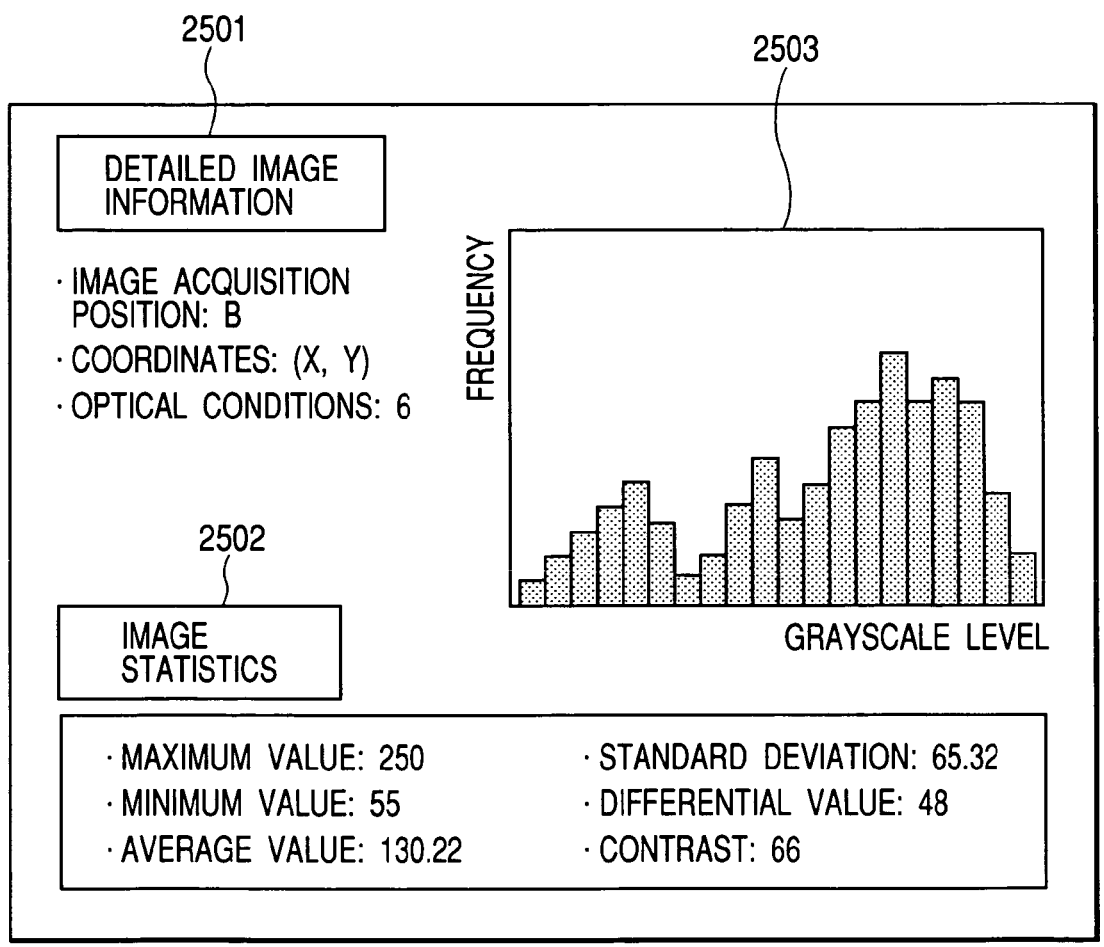
FIG. 25 is a view showing an embodiment of a detailed statistic information display screen for images in the present invention.

An example of a screen on which statistics on each image are independently displayed in detail is shown in FIG. 25. For example, to refer to further detailed information on the indexes for the acquired images listed as in FIG. 23, such detailed image information 2501, image statistics 2502, grayscale level frequency distribution chart 2503, etc. as shown in FIG. 25 can be displayed on the screen by clicking or double-clicking any one of the images 2331-2335 and 2341-2345 to be confirmed. Thus, indexes and a grayscale level histogram, both of which are normally not displayed, and other detailed information can be referred to, which, in turn, comes in handy for assigning conditions.

Figure 26:
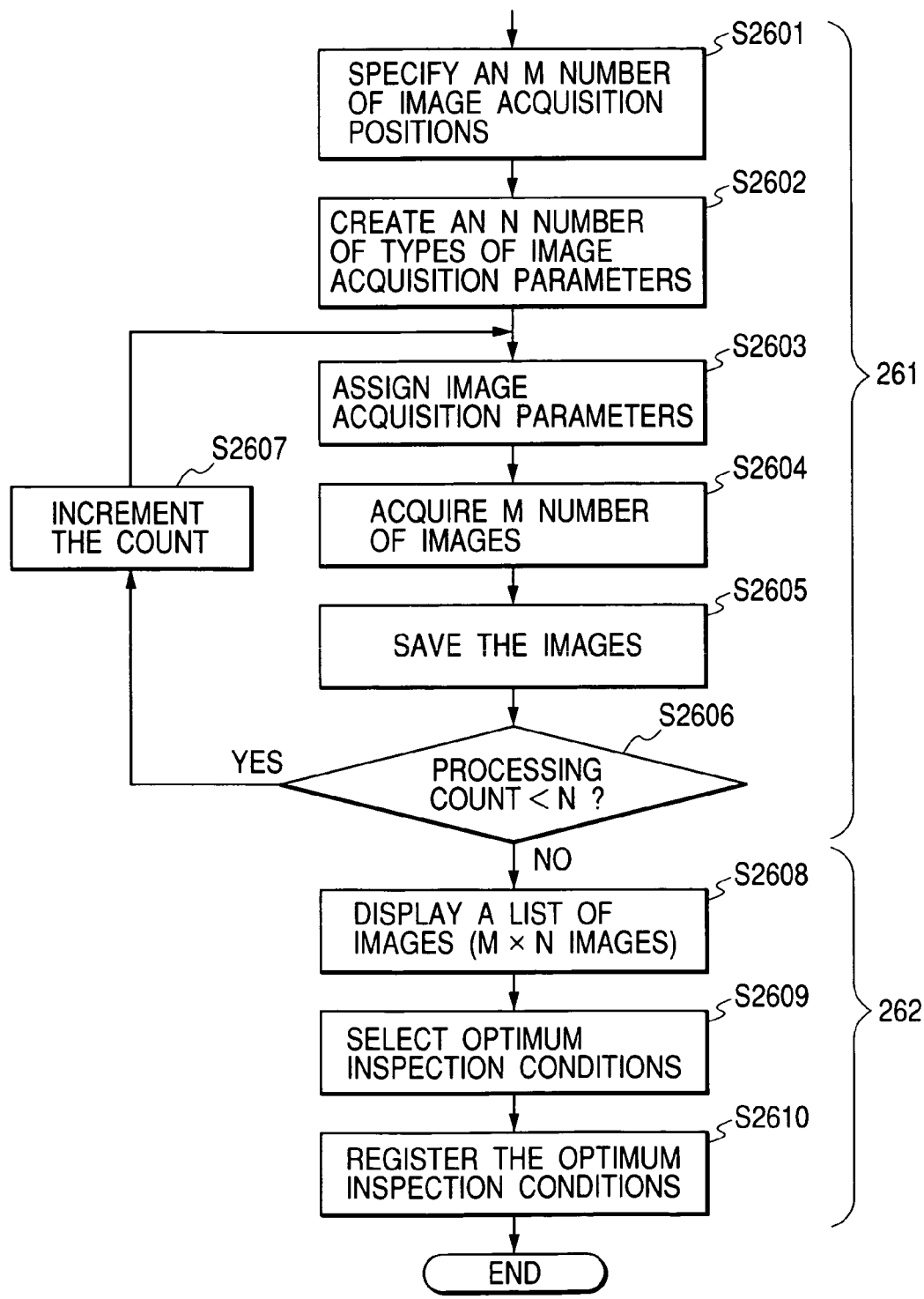
FIG. 26 is a diagram showing an embodiment of image acquisition parameter assignment flow pertaining to the present invention.

An example of the above conditions-assigning procedure is shown in FIG. 26.

The conditions-assigning procedure here comprises a step 261 in which a plurality of images are acquired by varying conditions, and a step 262 in which inspection conditions are determined (assigned) from a plurality of images for each of which different conditions are thus assigned.

In the step 261 of acquiring a plurality of images by varying conditions, first in sub-step S2601, the screen 2100 shown in FIG. 21 is displayed at the display 27 from the operation control unit 26 and a plurality (M number) of image acquisition positions are assigned using the input device 25. The assignment may be possible by, as described earlier herein, selecting suitable (characteristic) locations while viewing an image of a set wafer, or by entering in-wafer coordinates directly when a position of a defect to be detected is already known or when coordinates such as characteristic patterns are known beforehand.

Following the above sub-step, in sub-step S2602, the image acquisition parameter button 2103 is selected, the screen 500 shown in FIG. 5 is displayed at the display 27, and a plurality (N number) of optical conditions are assigned/registered using the input device 25 so as to be stored into the storage device 24.

Next, the above-assigned optical conditions are repeatedly reassigned in order in sub-step S2603, and images are acquired from the assigned M number of locations in sub-step S2604. Acquired images are saved in a memory of the defect detection unit 18, a memory of the operation control unit 26, the storage device 24, and the like, in sub-step S2605. Whether a processing count of N has been reached is judged in sub-step S2606, and if N is not reached, the count is incremented in sub-step S2607 and the image acquisition is further continued under the next conditions (optical conditions/inspection parameters) so as to obtain all images under the N number of sets of assigned conditions.

Next in the step 262 of determining (assigning) inspection conditions from a plurality of images each different in conditions, the (M×N) number of images are listed at the display 27 of the operation control unit 26 in sub-step S2608, as shown in FIG. 22 or 23. The operator views the images and then while referring to the indexes and recommended value displayed on the screen, selects optimum inspection conditions in sub-step S2609. The selection can also be made automatically. The conditions, after being selected, are registered and saved in sub-step S2610. This completes assignment of the image acquisition conditions.

Figure 27:
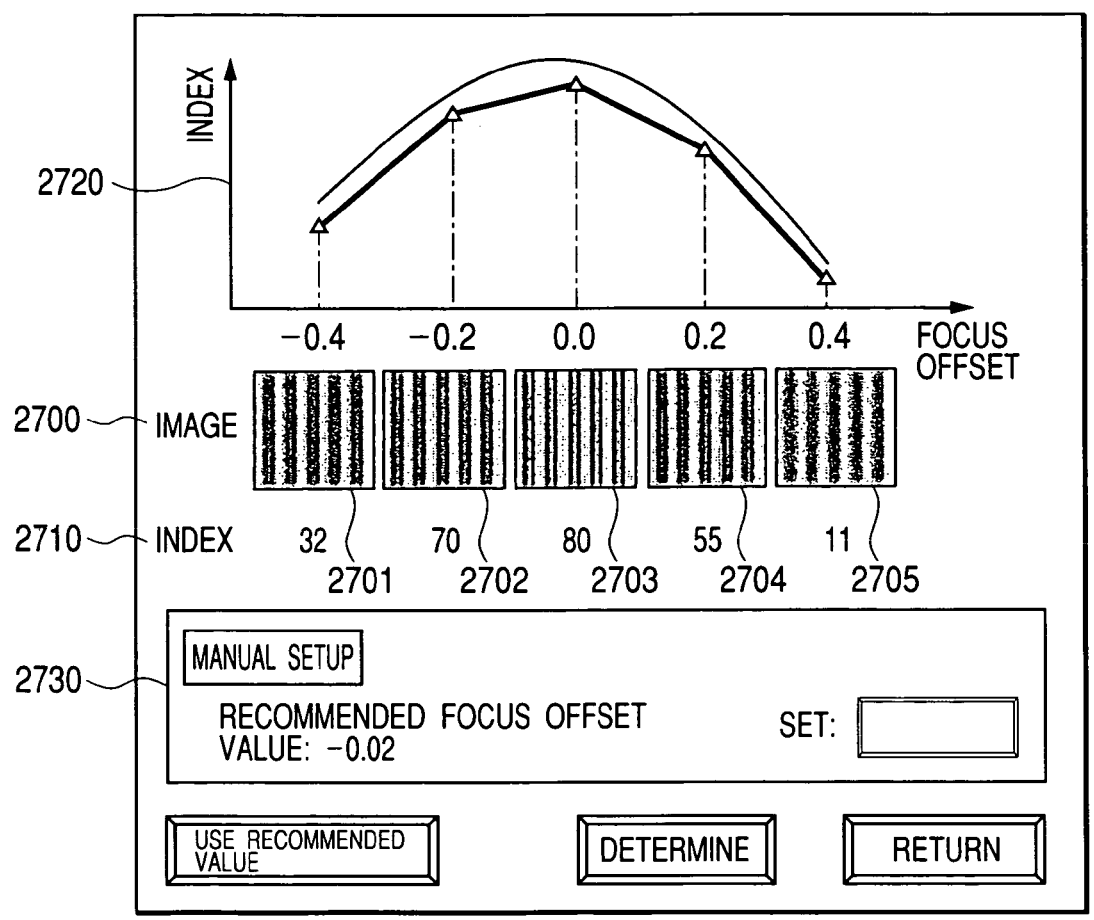
FIG. 27 is a view showing an embodiment of a height adjustment screen for a focus position in the present invention.

An example of a screen for adjusting a focus offset quantity (height of focus position), which is one of image acquisition conditions assignment items, is shown in FIG. 27. In the configuration of FIG. 1, a height of a sample 1 rested on the theta-stage 5 is sequentially varied by driving the Z-stage 4, and a plurality of images different in height are acquired from a previously specified position on the sample 1. A list display 2700 of the thus-acquired plurality of images 2701 to 2705 is presented to assist the selection of the optimum focus position. In this case, quantitative evaluation also becomes possible by processing the acquired images at the plurality of heights and displaying these images together with, for example, the contrast, differential values, and other computation results added as indexes 2710. Further displaying a graph 2720 allows the operator to perform selections more easily. In the example of FIG. 27, several indexes are approximated, a focus offset value likely to be a real peak is computed, and this value is displayed as a recommended value at a position 2730. Also, an image at a height not sampled can be created and displayed by being interpolated from peripheral images. Although an image with a focus offset value of 0.1 is not acquired in the example of FIG. 27, this image can be created by interpolating images of 0.0 and 0.2.

Figure 28:
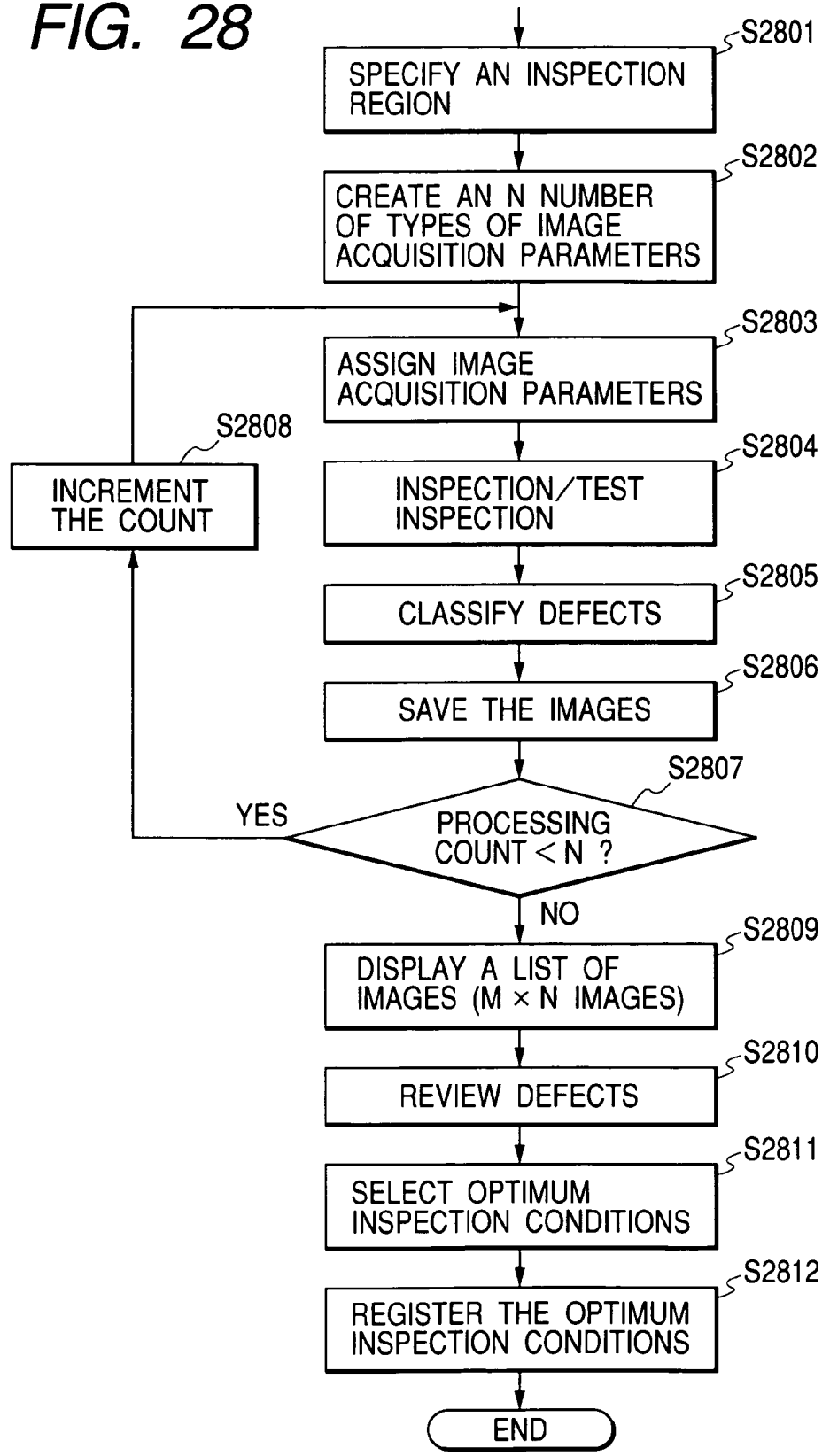
FIG. 28 is a flowchart showing an embodiment of an inspection parameter assignment method pertaining to the present invention.

An assignment procedure relating to the inspection conditions (image acquisition parameters, inspection parameters) that utilize an inspection process and an image-listing function is shown in FIG. 28. First, a region to be inspected on a wafer-by-wafer or chip-by-chip basis is assigned in step S2801 and a plurality (N number) of sets of inspection conditions are assigned in step S2802 in a manner similar to the foregoing. While the thus-assigned conditions are being sequentially varied in step S2803, an inspection or a test inspection and a defect classification are repeatedly conducted in steps S2804 and S2805, respectively, and images and defect information (attributes such as coordinates, areas, and sizes, and if the classification has been repeatedly conducted, classification categories) of the defects detected are saved in step S2806.

Whether a processing count has reached N is judged in step S2807, and if N is not reached, the count is incremented in step S2808, then the next conditions (inspection parameters) are assigned in step S2803, and the inspection and classification processes are further continued in steps S2804 and S2805, respectively. After the inspections under all sets of conditions have ended in step S2807, a list of acquired defect images is displayed at the display 27 in step S2809 similarly to the example of FIG. 22. Detection counts should also be displayed since the number of defects detected is estimated to differ according to conditions. The usable criterion for selecting which set of conditions is optimal could conceivably be the total number of defects detected, the ratio of any false defects included in the total detection count, the rate of minute defects, whether the defects to be reviewed with extra careful attention are included, and so on. Also, judgment becomes e easier by classifying defects and displaying the results for each classification category.

When defect images are to be displayed in list form, it is also possible to make such more advanced display as shown in FIG. 23. Quantitative evaluation becomes possible by displaying sizes and shapes of defects, an average value of grayscale levels, a distribution of each detect, coarse/fine information of pattern, contrast, and other attributes, as indexes.

Although the application of the present invention to an optical semiconductor pattern inspection tool has been described above, the invention is not limited by such application and is applicable to a variety of inspection tools which requires conditions assignment, such as: a foreign-particle inspection tool, an electronic pattern inspection tool, or a combination thereof, or a liquid-crystal display inspection tool, or a photomask inspection tool.

According to the present invention, it is possible to assist an operator in assigning conditions when creating an inspection recipe, and thus to reduce assigning labor and time.

According to the present invention, since all defects are classified, it is also possible to analyze and understand defect distributions since no classification omissions occur.

In addition, according to the present invention, a tool availability improvement effect by reduction in the time occupied for assigning tool conditions can even be anticipated.

Furthermore, according to the present invention, a tool availability improvement effect by reduction in defect classification time can likewise be anticipated since the classification of all defects is completed almost simultaneously with completion of inspection.

According to the present invention, detection reliability for defects can be enhanced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes that come within the meaning and range of equivalency of the claims are therefore intended to be embraced therein.

What is claimed is:

1. A method of inspecting defects, comprising:
a step of assigning an inspection recipe;
a step of inspecting a sample using the inspection recipe assigned; and
a step of outputting results of the inspection;
wherein said step of assigning an inspection recipe further includes:
an image signal acquisition step in which images of a sample are each sequentially acquired under a plurality of sets of image acquisition conditions differing from each other and a plurality of image signals each different in image acquisition conditions are sequentially acquired; and
wherein said step of inspecting the sample further includes:
a displaying step for displaying on a display the plurality of sequential acquired image signals together with information of the image acquisition conditions and indexes which indicate appropriateness of the image signals for detecting defects;
an image acquisition conditions determination step for determining the image acquisition condition based upon the displayed images and the displayed indexes;
an image processing step for processing the images acquired under the determined image acquisition conditions by varying defect detection conditions;
a defect detection conditions determination step for determining the defect detection conditions by using information from images processed at the image processing step; and
a defect detection step in which, from each of the plurality of image signals sequentially acquired under different sets of image acquisition conditions in said image signal acquisition step, defect candidates are detected for each of the plurality of sets of image acquisition conditions, and position information of the defect candidates detected is acquired.

2. The inspection method according to claim 1, wherein:
in said defect detection step, on the basis of assigned inspection conditions, defect candidates for each of said image acquisition signals are each detected from the image signals sequentially acquired therefrom.

3. The inspection method according to claim 1, wherein:
in said defect detection step, said image signal acquisition step, said defect detection step, and said classification step are each repeated a plurality of times under the same image acquisition conditions.

4. The inspection method according to claim 1, wherein said indexes which indicate appropriateness of the image signals for detecting defects incorporate at least one of statistical properties derived from image statistics.

5. The inspection method according to claim 4, wherein said indexes which indicate appropriateness of the image signals for detecting defects incorporate at least one of an image contrast, a differential value, a grayscale level, and a standard deviation.

6. The inspection method according to claim 1, wherein said image acquisition conditions determination step includes a process of selection of the image acquisition conditions under which at least one index takes a predetermined value.

7. The inspection method according to claim 6, wherein the process of selection of the image acquisition conditions is an automatic process.

8. The inspection method according to claim 1, further comprising a step of classification of said defect candidates into one of a plurality of the defect categories.

9. The inspection method according to claim 8, wherein during the step of classification each of said defect candidates is classified into only one of a plurality of the defect categories.

10. The inspection method according to claim 8, wherein during the step of classification each of said defect candidates is classified into only one of a plurality of the defect categories, and image acquisition conditions are selected in accordance with said image acquisition conditions determination step and recorded in said inspection recipe associated with the defect classification.

* * * * *